US011274456B2

(12) United States Patent
Forrest

(10) Patent No.: US 11,274,456 B2
(45) Date of Patent: Mar. 15, 2022

(54) BUILDING STRUCTURE TRANSLATION SYSTEM AND METHOD

(71) Applicant: Gregory Holden Forrest, Indio, CA (US)

(72) Inventor: Gregory Holden Forrest, Indio, CA (US)

(73) Assignee: HIBER TECHNOLOGIES LLC, Indio, CA (US)

( * ) Notice: Subject to any disclaimer, the term of this patent is extended or adjusted under 35 U.S.C. 154(b) by 0 days.

(21) Appl. No.: 17/010,826

(22) Filed: Sep. 3, 2020

(65) Prior Publication Data

US 2021/0189741 A1    Jun. 24, 2021

Related U.S. Application Data

(60) Provisional application No. 62/953,434, filed on Dec. 24, 2019.

(51) Int. Cl.
| | |
|---|---|
| *E04H 9/14* | (2006.01) |
| *B66B 9/02* | (2006.01) |
| *E04G 1/18* | (2006.01) |
| *E04H 9/16* | (2006.01) |
| *B66B 9/04* | (2006.01) |

(52) U.S. Cl.
CPC ............... *E04G 1/18* (2013.01); *E04H 9/14* (2013.01); *E04H 9/16* (2013.01); *B66B 9/02* (2013.01); *B66B 9/04* (2013.01)

(58) Field of Classification Search
CPC .... E04G 1/18; E04H 9/14; E04H 9/16; B66B 9/04; B66B 9/02; B66F 7/0666; B66F 7/08
See application file for complete search history.

(56) References Cited

U.S. PATENT DOCUMENTS

| | | | | | |
|---|---|---|---|---|---|
| 2,975,868 A | * | 3/1961 | Long | ................... | B66F 3/22 187/269 |
| 3,341,042 A | * | 9/1967 | Carder | .................. | B66F 7/08 414/471 |
| 3,613,834 A | * | 10/1971 | Field | ..................... | B66B 9/04 187/274 |

(Continued)

FOREIGN PATENT DOCUMENTS

DE    102019111659 A1 * 11/2020   ............ B66F 7/0658

*Primary Examiner* — Phi D A
(74) *Attorney, Agent, or Firm* — Cohen IP Law Group, P.C.; Michael N. Cohen

(57) ABSTRACT

A system and method used to translate a building structure (e.g., a single-family home) from a first position (e.g., above grade) to a second position (e.g., below grade) is provided. The system may thereby protect building structures from above grade threats such as wildfires, tornados, hurricanes, and other threats by lowering the building structure into a below grade cavity and sealing it therein. The system may include a base that supports the building structure and a translation system that lowers the base and the building structure below grade. The translation system may include scissor lifts, hydraulic lifts, jackscrew lifts and/or other types of lifts. The system also may include a quick release utilities system to disconnect the various utilities during the translation and a protective roof that may be extended over the top of the building structure to protect it from the threats above.

20 Claims, 27 Drawing Sheets

(56) References Cited

U.S. PATENT DOCUMENTS

| | | | | |
|---|---|---|---|---|
| 4,518,061 | A * | 5/1985 | Wehmeyer | B66F 11/042 182/141 |
| 4,614,251 | A * | 9/1986 | Hawkins | B66F 7/0625 182/141 |
| 4,854,421 | A * | 8/1989 | Kawada | B66F 7/0666 187/211 |
| 4,867,277 | A * | 9/1989 | Sloan | B66F 7/0608 187/243 |
| 5,001,514 | A * | 3/1991 | Leonhart | G03B 27/16 355/79 |
| 5,109,952 | A * | 5/1992 | Starks | B66F 7/0625 182/141 |
| 5,727,655 | A * | 3/1998 | Pitman | B66F 7/0641 108/145 |
| 5,794,389 | A * | 8/1998 | Vysma | E04B 1/34363 52/169.6 |
| 5,974,743 | A * | 11/1999 | Vaia | E04H 9/02 52/169.6 |
| 6,026,934 | A * | 2/2000 | Deurloo | B66B 9/04 187/274 |
| 6,338,596 | B1 * | 1/2002 | Galeazzi | B65F 1/1457 220/484 |
| 6,467,231 | B1 * | 10/2002 | Carlinsky | E04H 9/14 52/698 |
| 7,856,924 | B1 * | 12/2010 | Stihi | A47J 37/0731 99/419 |
| 8,066,578 | B2 * | 11/2011 | Liggett | A63G 31/02 472/136 |
| 9,670,039 | B1 * | 6/2017 | Enochs | B66F 3/22 |
| 10,730,729 | B1 * | 8/2020 | Cui | E04G 1/24 |
| 2005/0045428 | A1 * | 3/2005 | Rennetaud | B66B 9/02 187/269 |
| 2006/0180401 | A1 * | 8/2006 | Bourgeois | B66B 9/0861 187/250 |
| 2008/0135334 | A1 * | 6/2008 | Graham | B66F 7/0625 182/141 |
| 2008/0190707 | A1 * | 8/2008 | Hoth | A61G 7/012 187/269 |
| 2009/0053024 | A1 * | 2/2009 | Myers | E04H 6/06 414/229 |
| 2009/0260925 | A1 * | 10/2009 | Schilling | B66F 7/08 187/269 |
| 2013/0112500 | A1 * | 5/2013 | Keersmaekers | B66B 9/02 182/14 |
| 2014/0248114 | A1 * | 9/2014 | Sawyer | B66F 7/08 414/812 |
| 2015/0314988 | A1 * | 11/2015 | Lowe | B66F 7/0666 187/269 |
| 2016/0176688 | A1 * | 6/2016 | Crumpler, Jr. | B66F 7/0666 254/9 C |
| 2016/0281382 | A1 * | 9/2016 | Groves | E04B 1/34363 |
| 2021/0180357 | A1 * | 6/2021 | Borden | B66F 7/0658 |

* cited by examiner

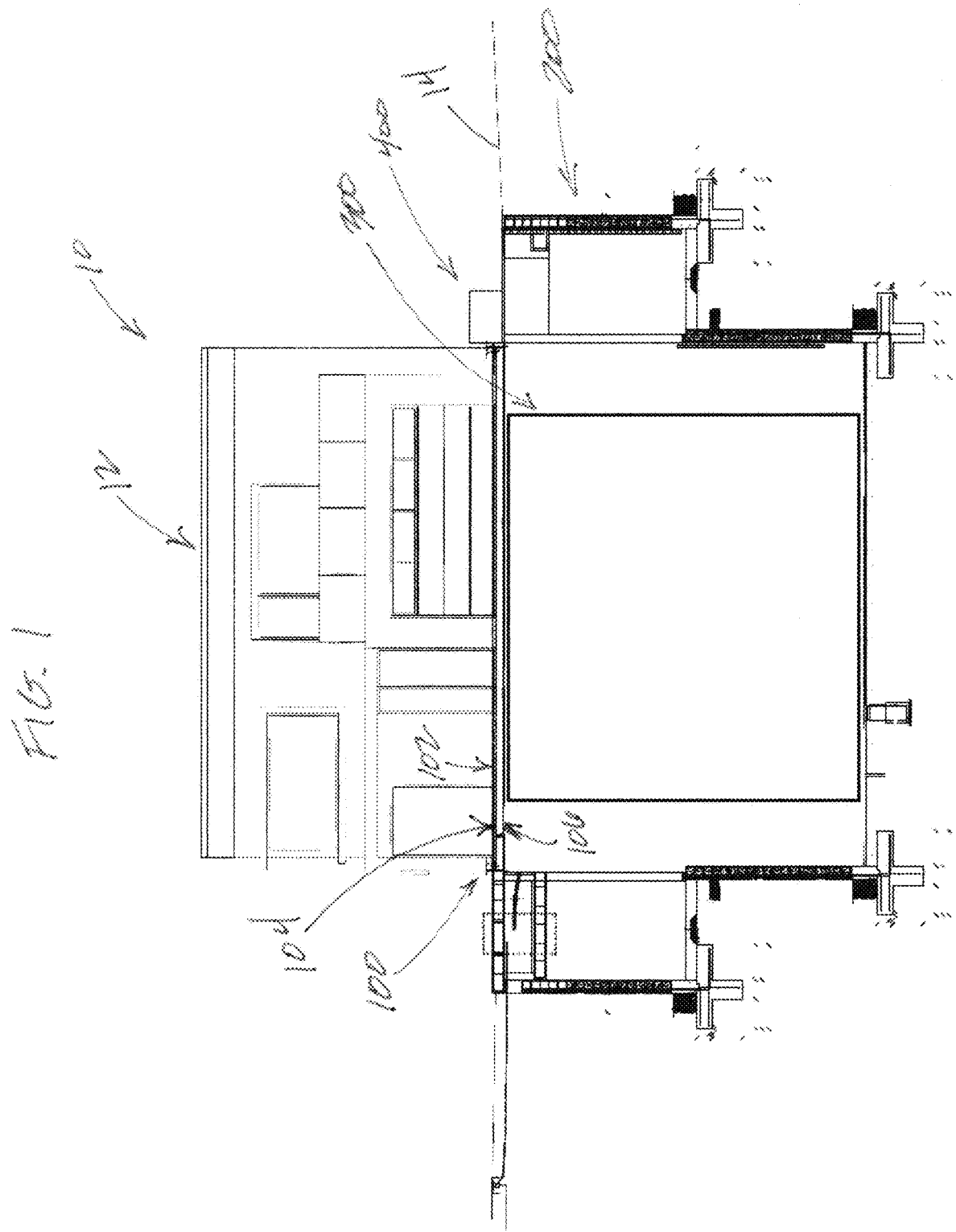

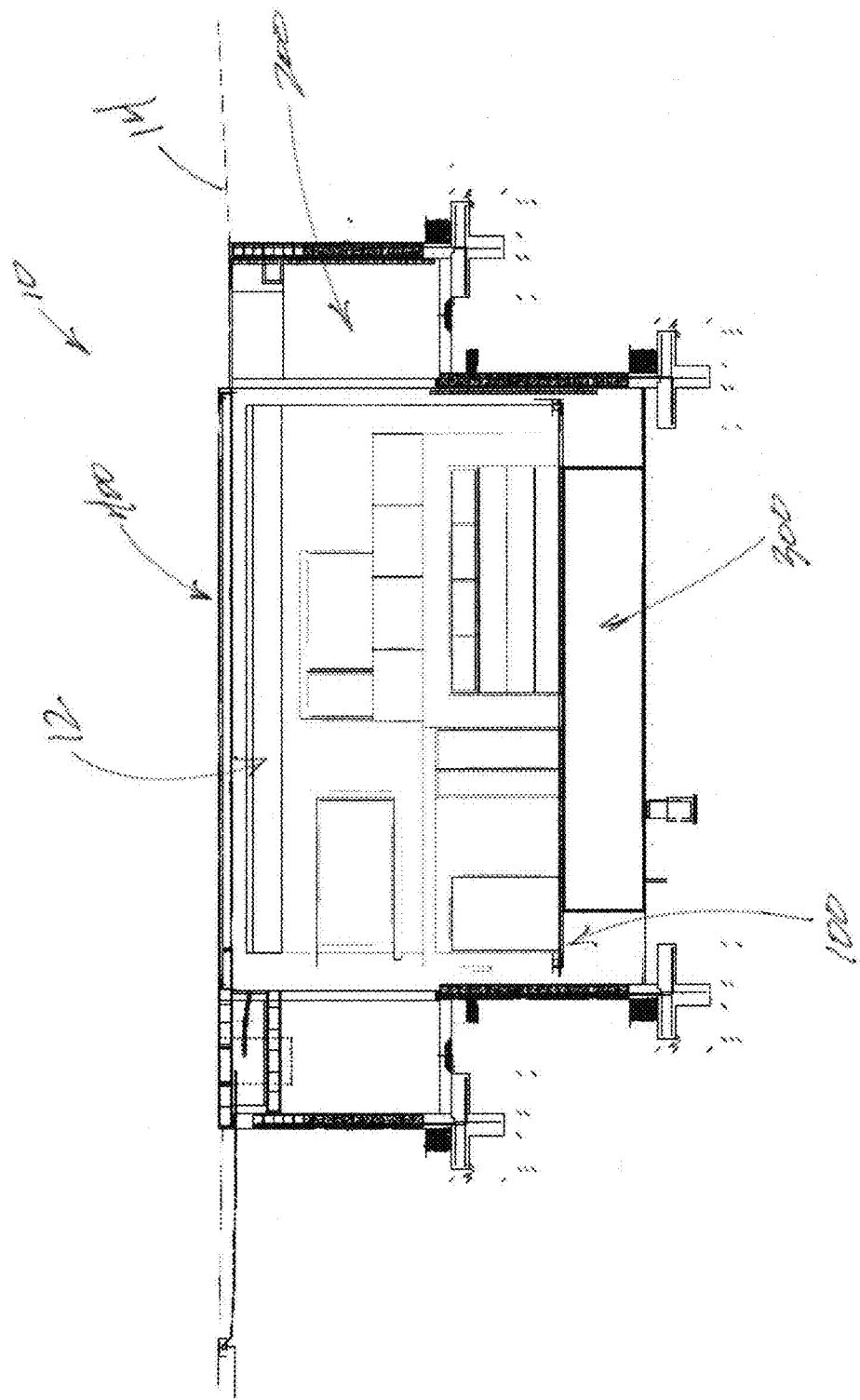

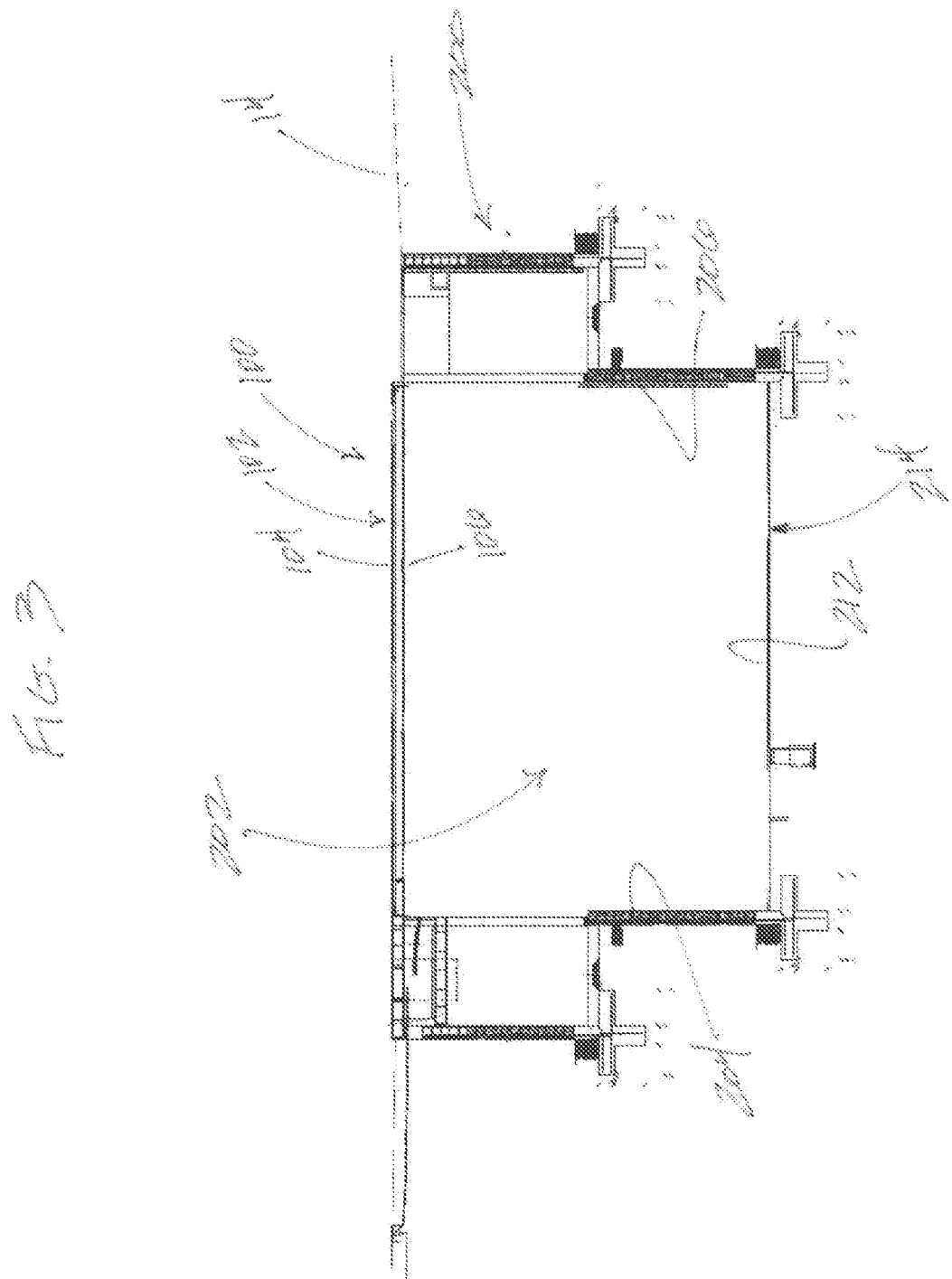

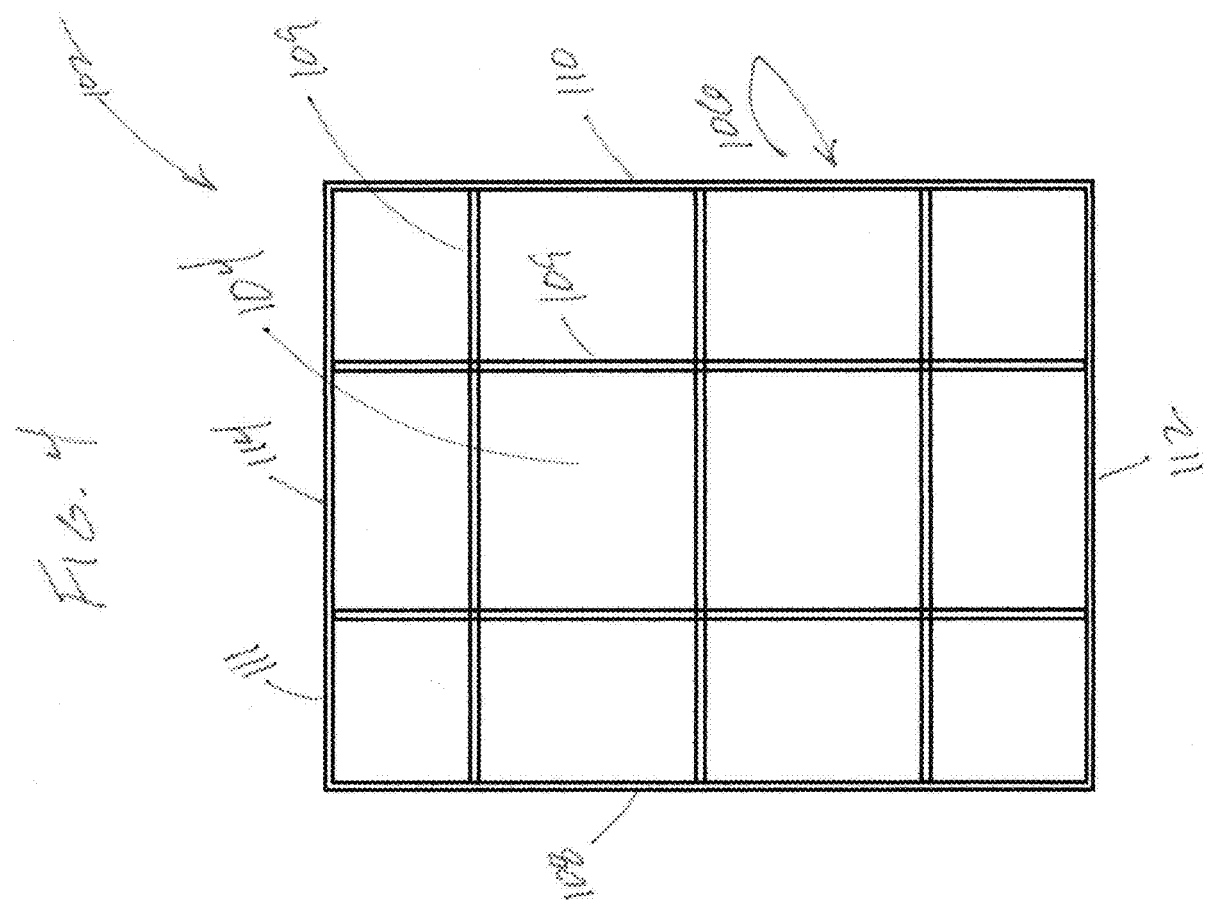

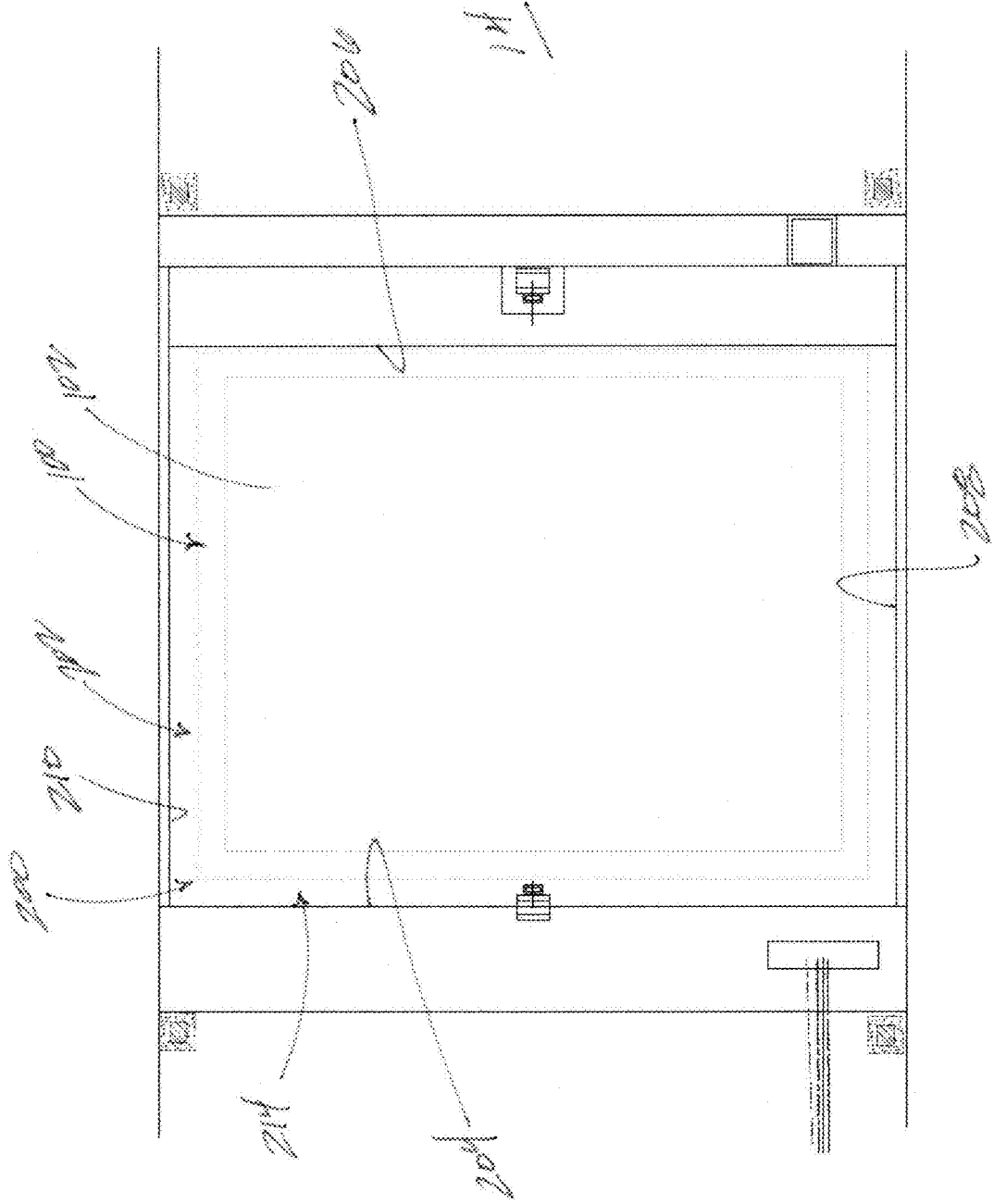

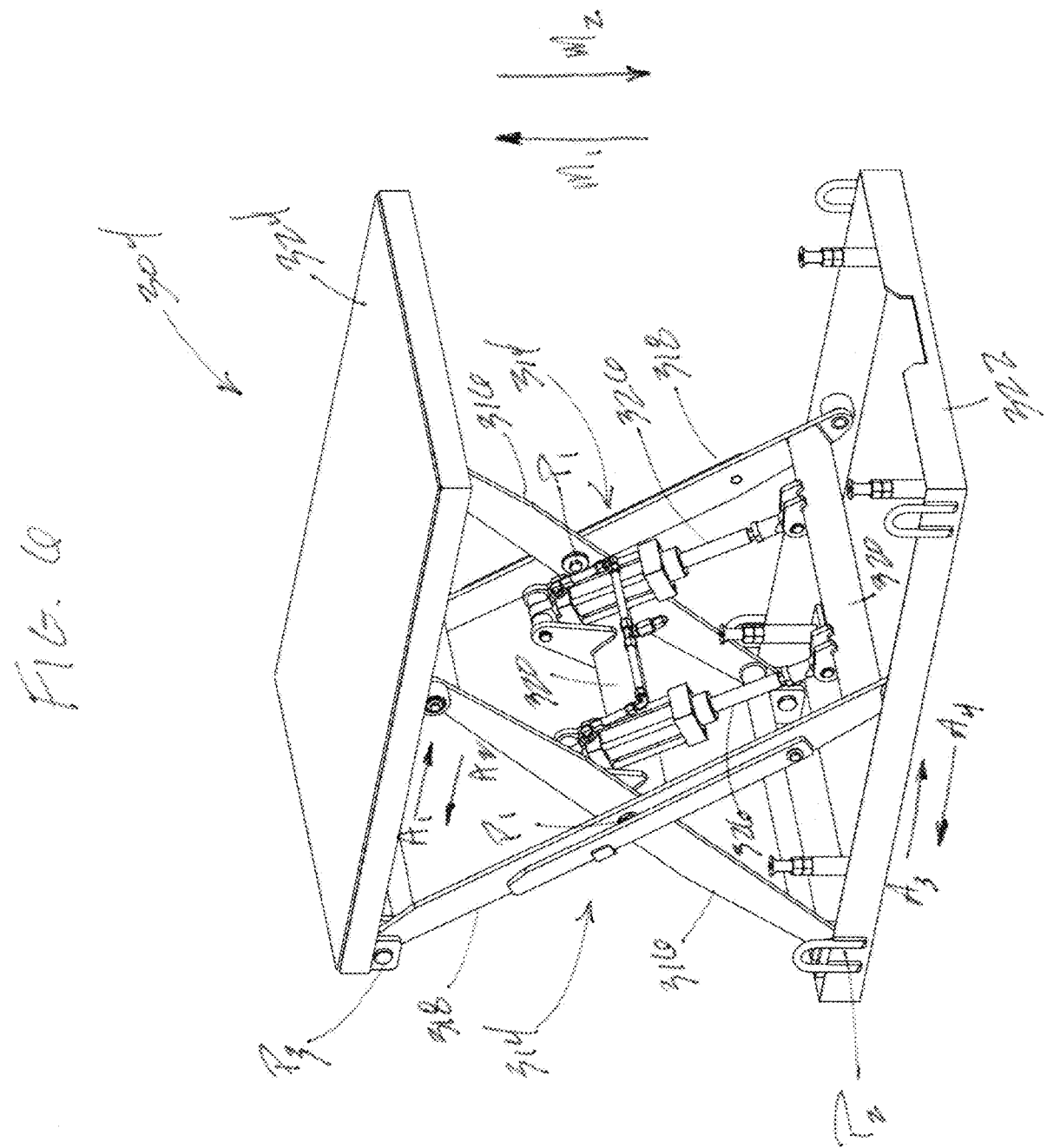

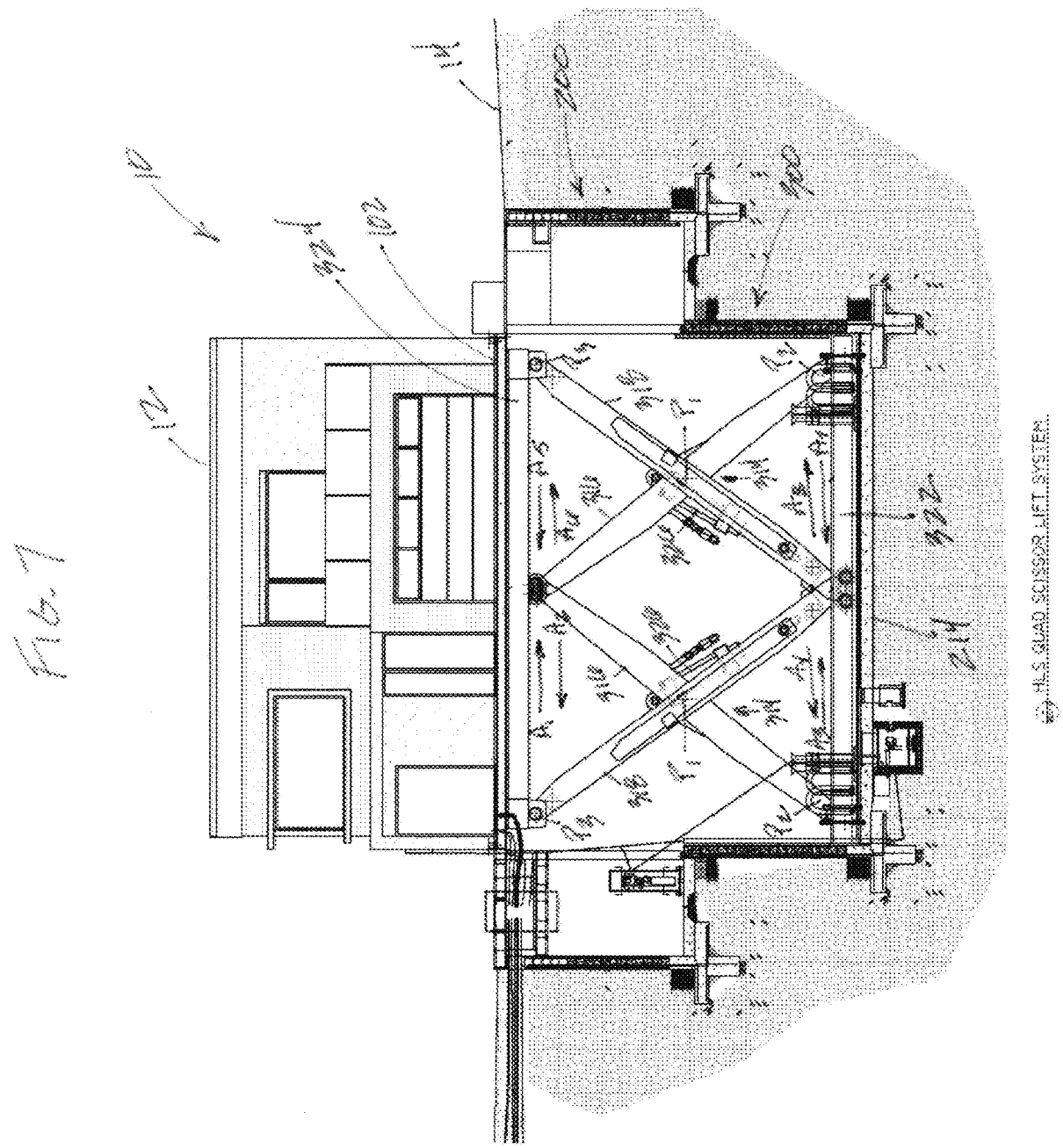

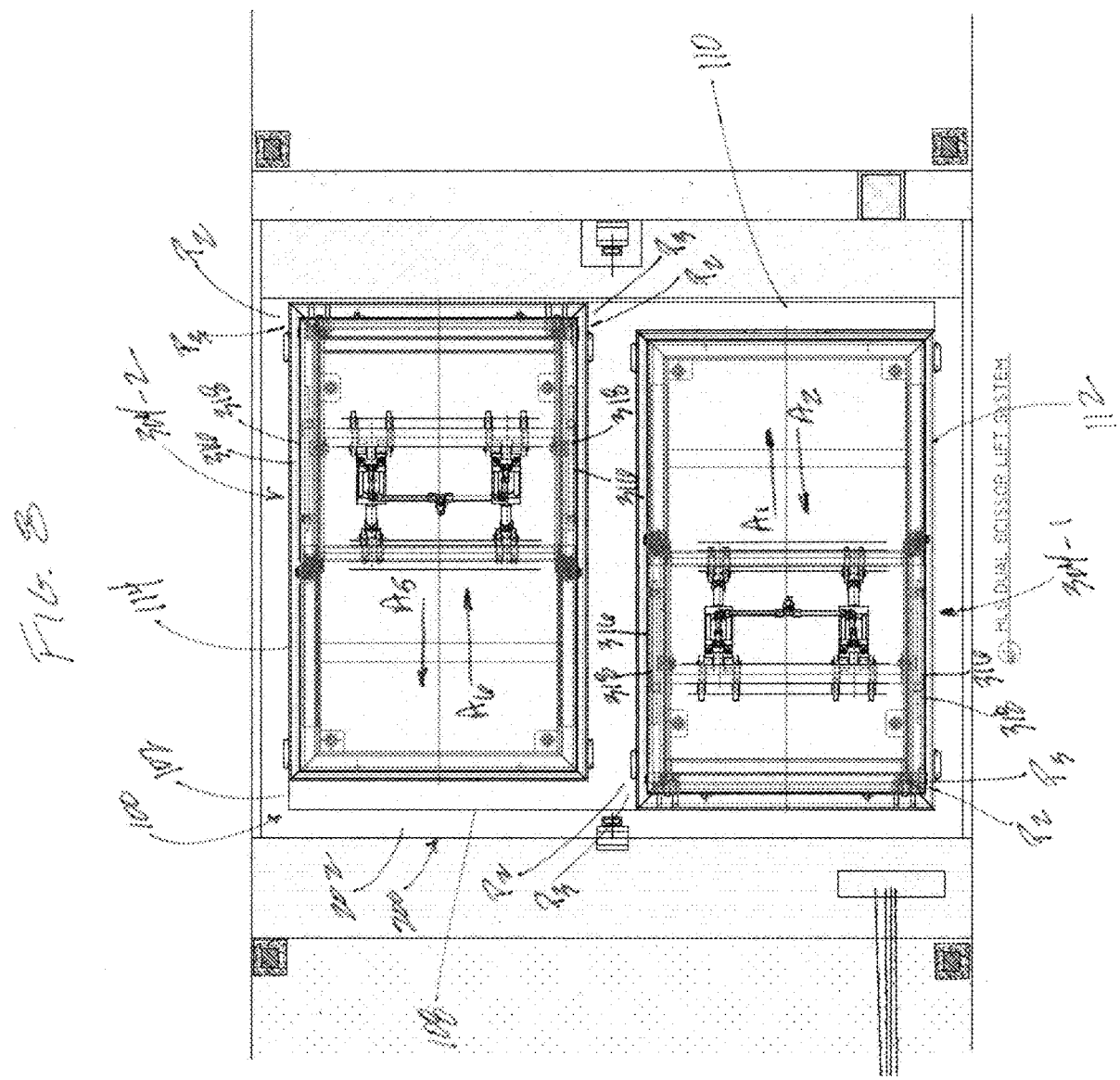

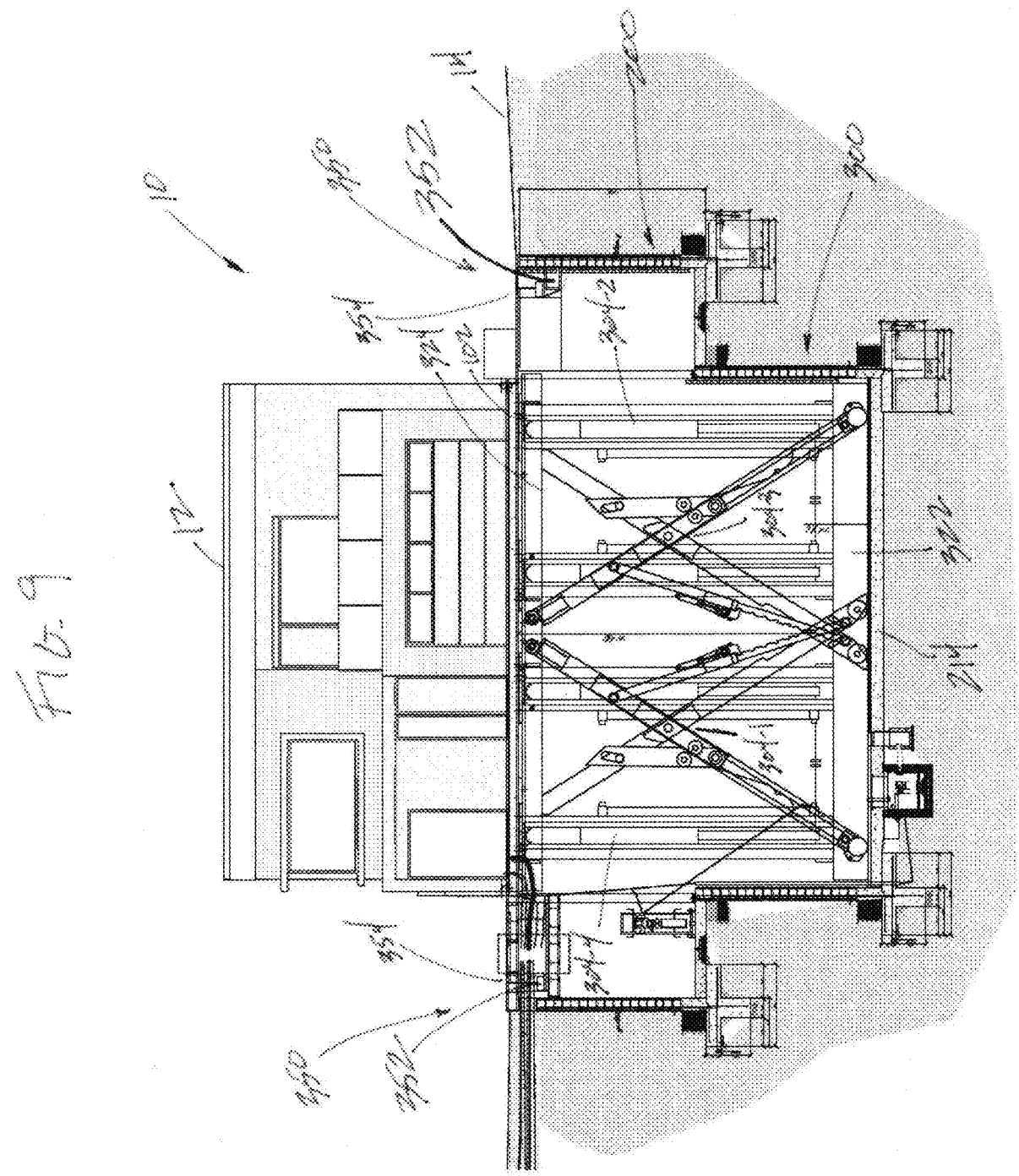

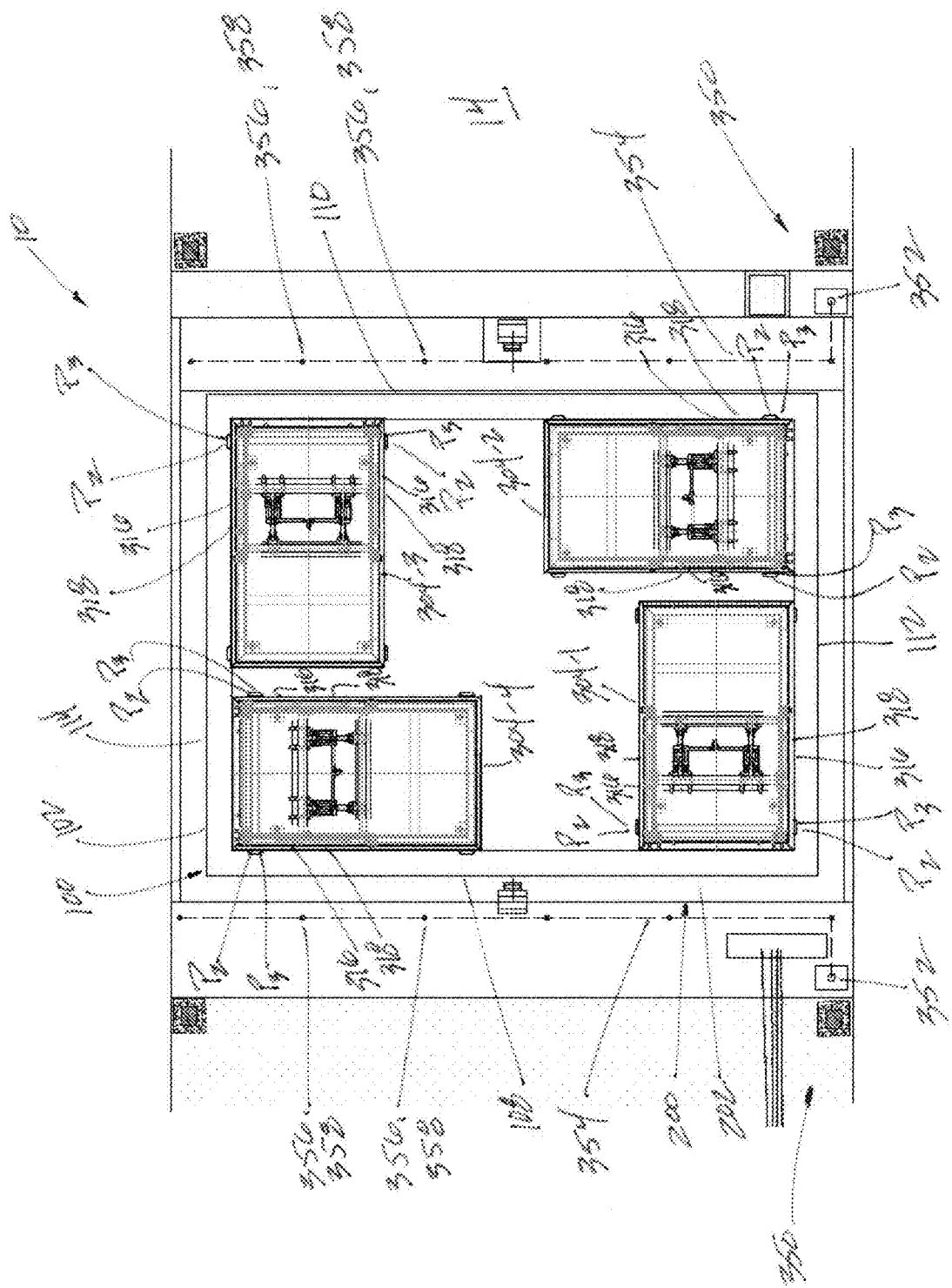

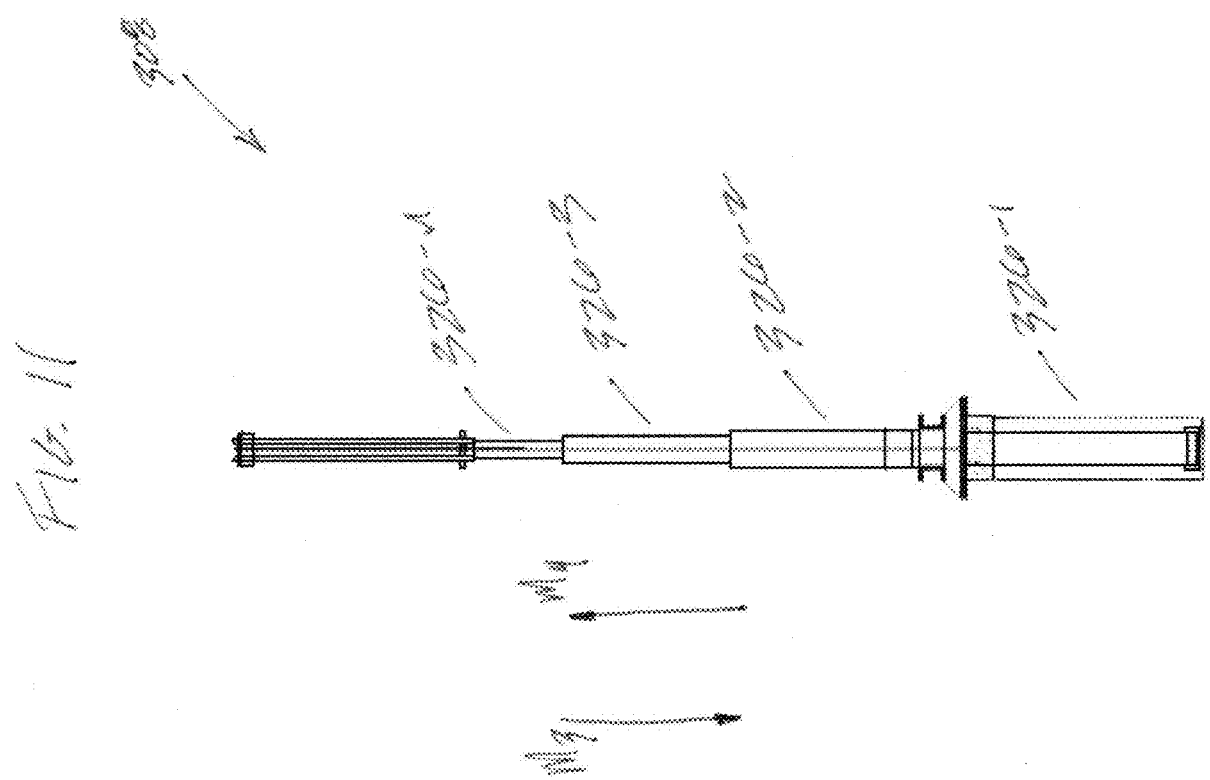

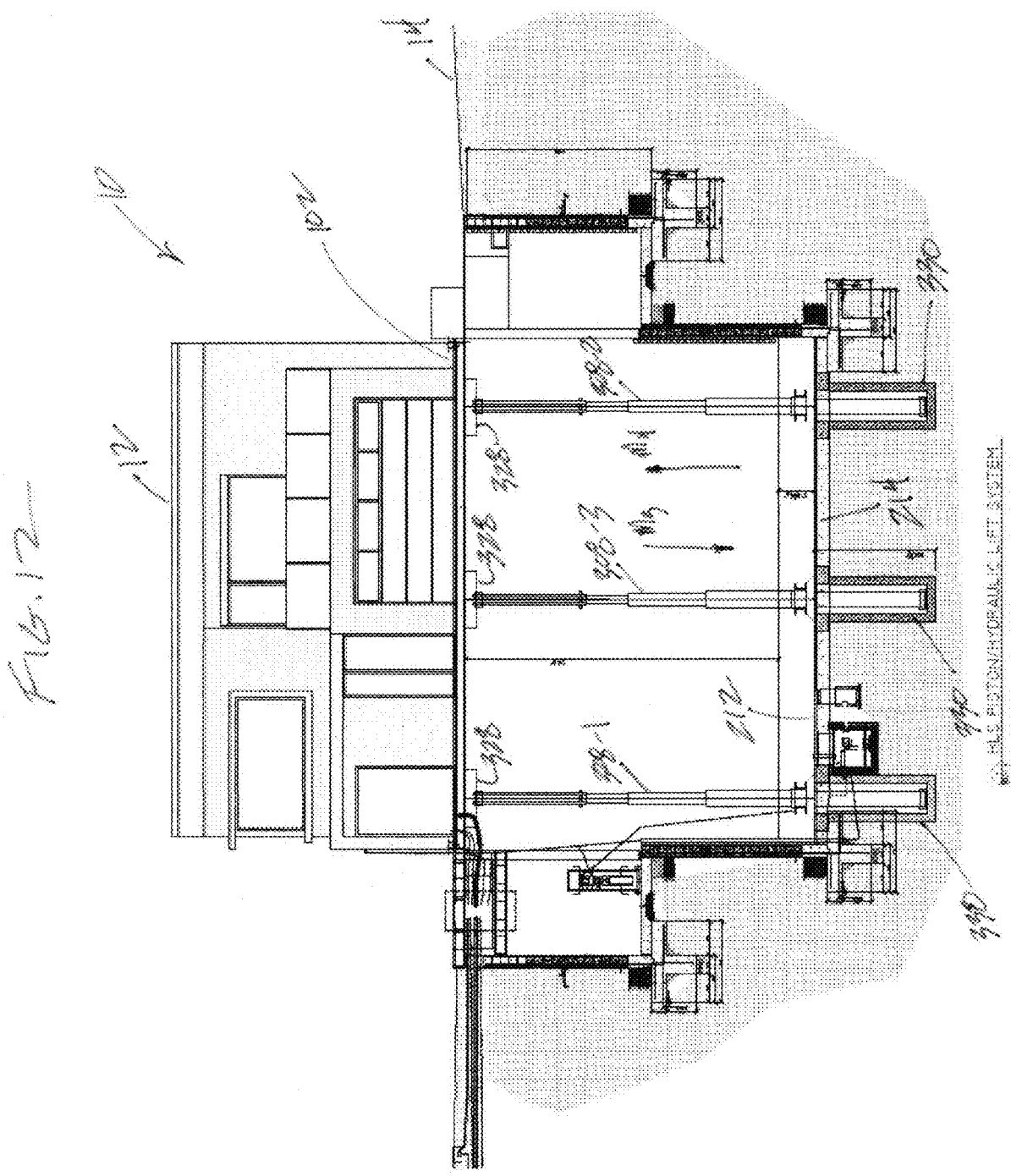

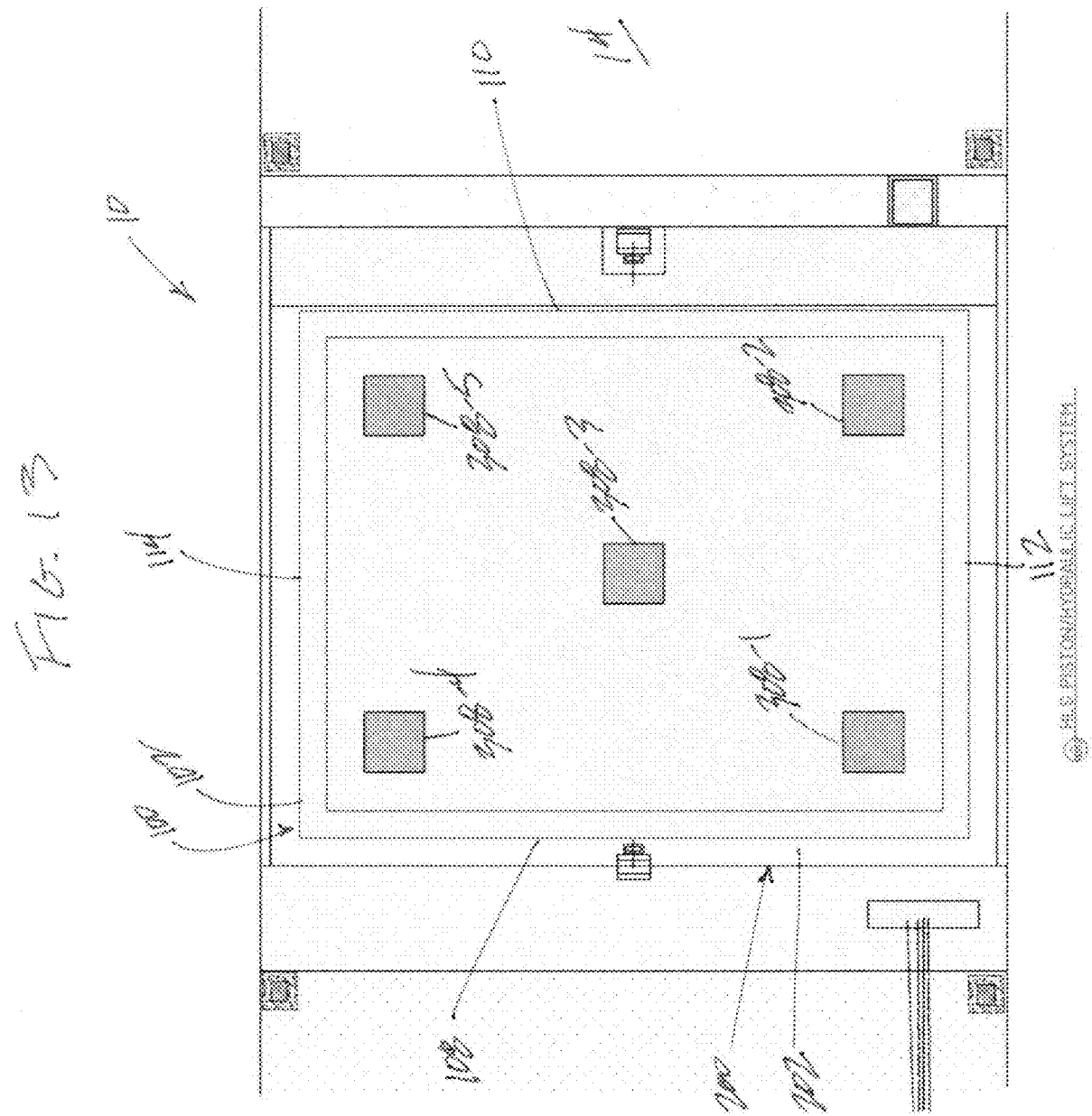

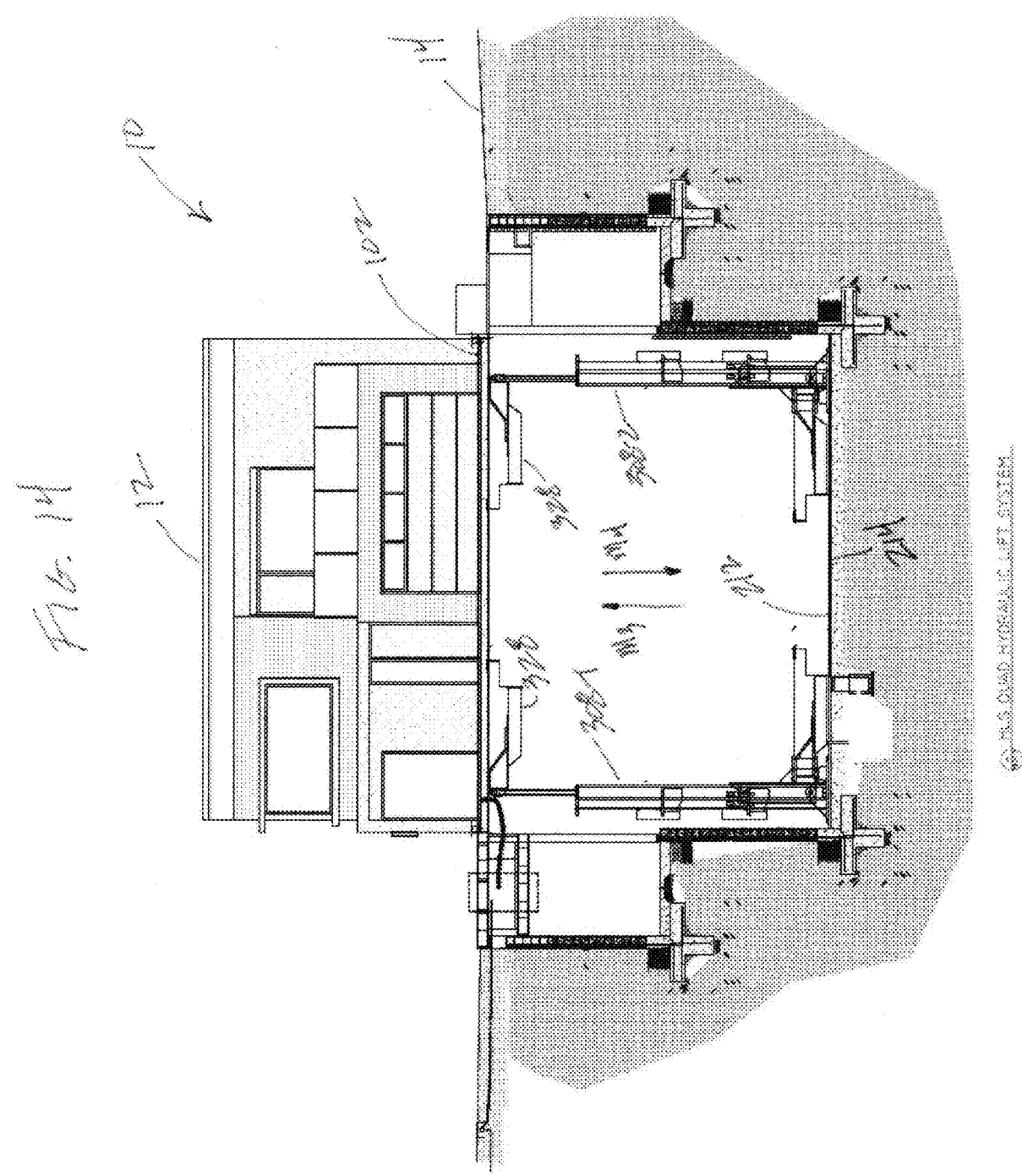

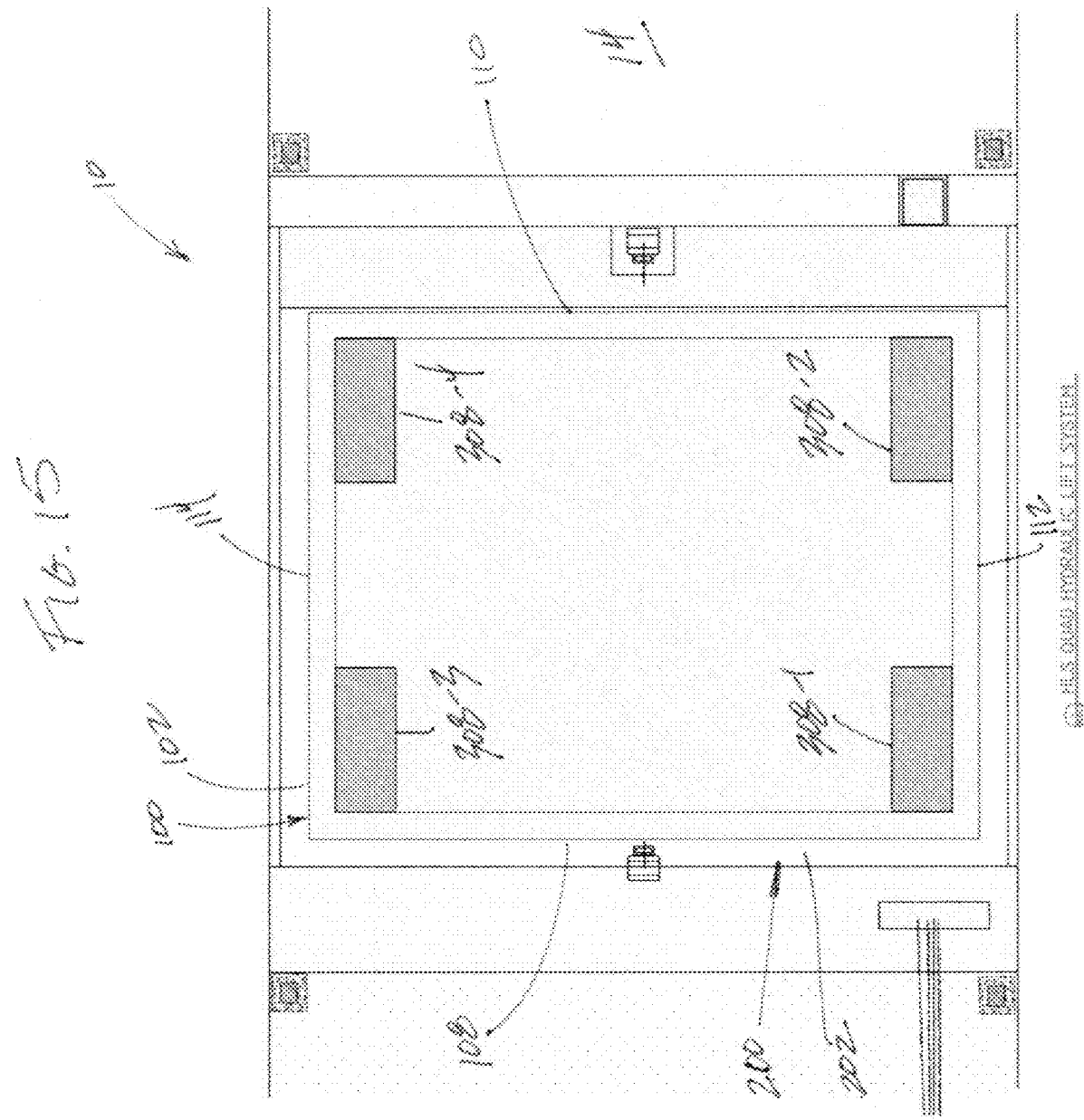

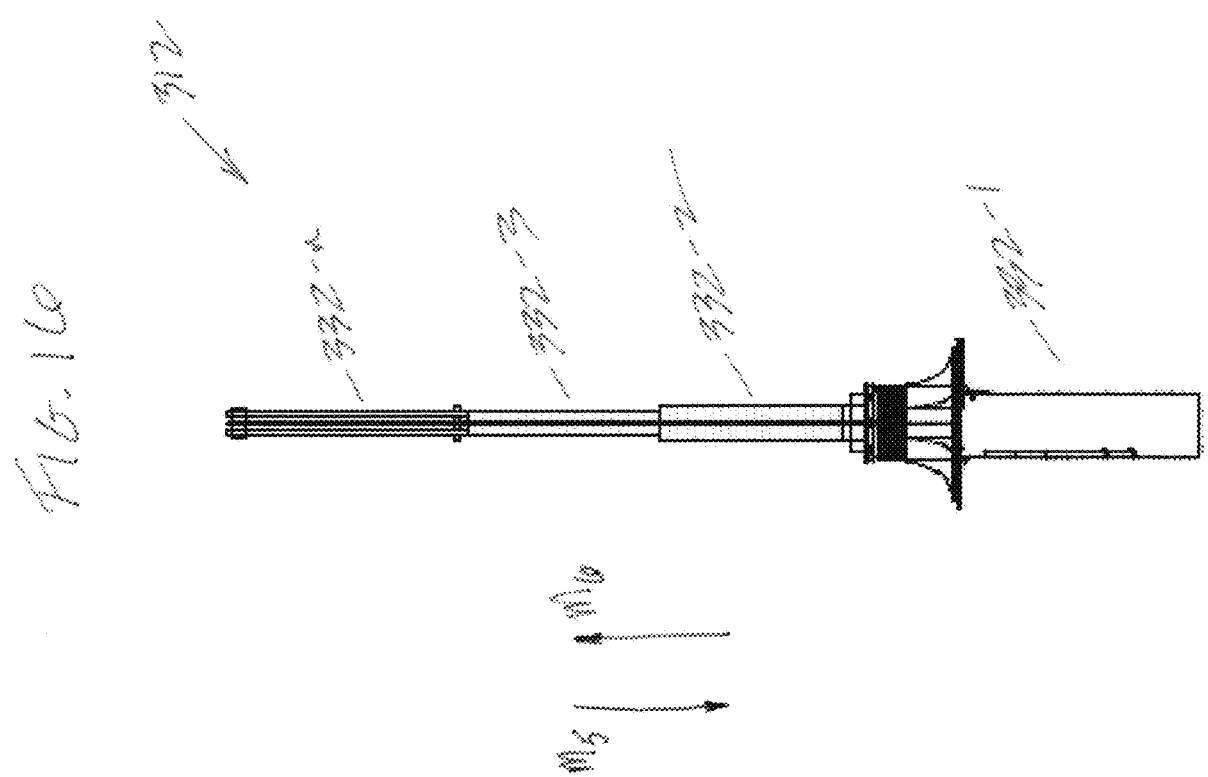

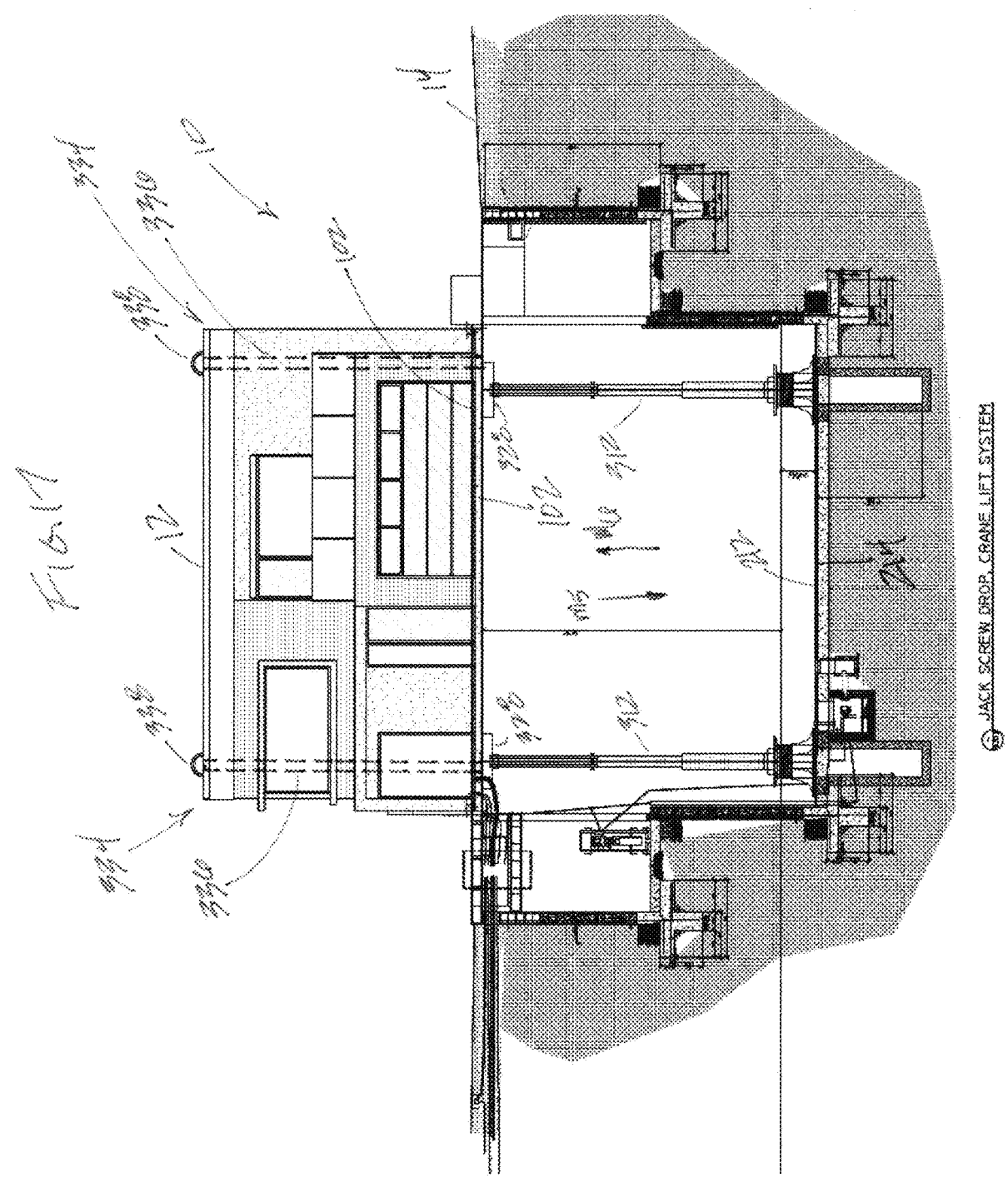

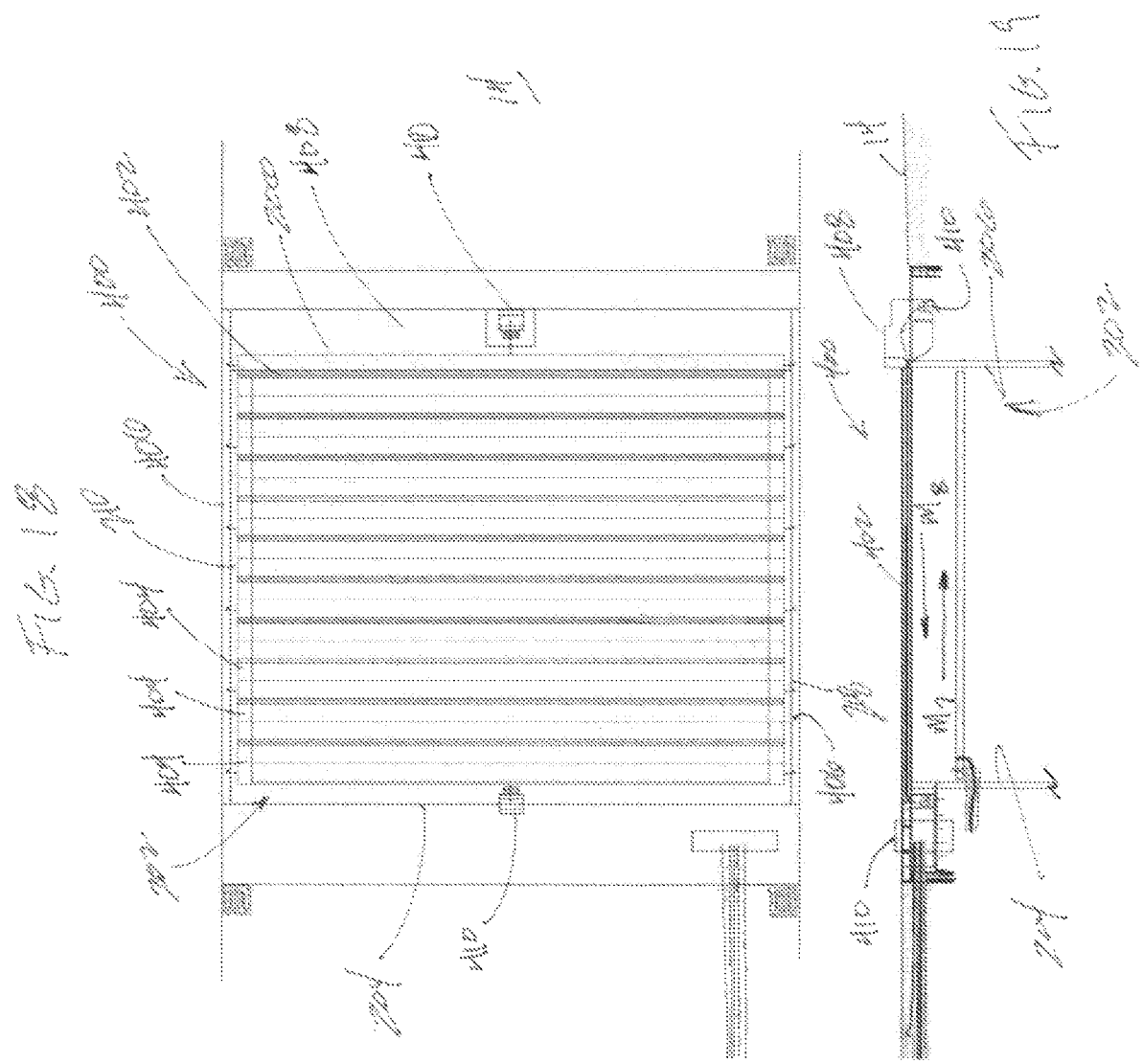

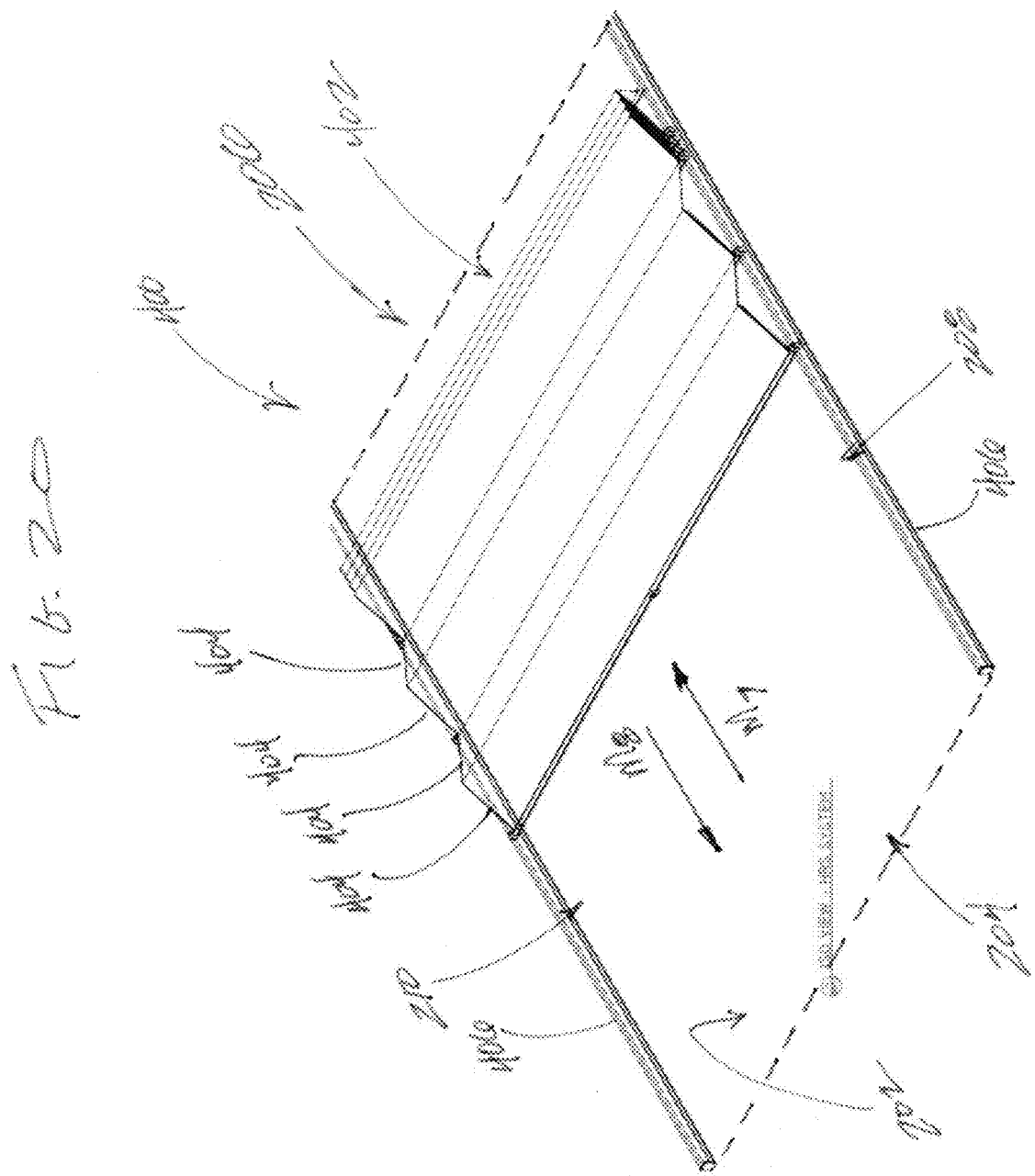

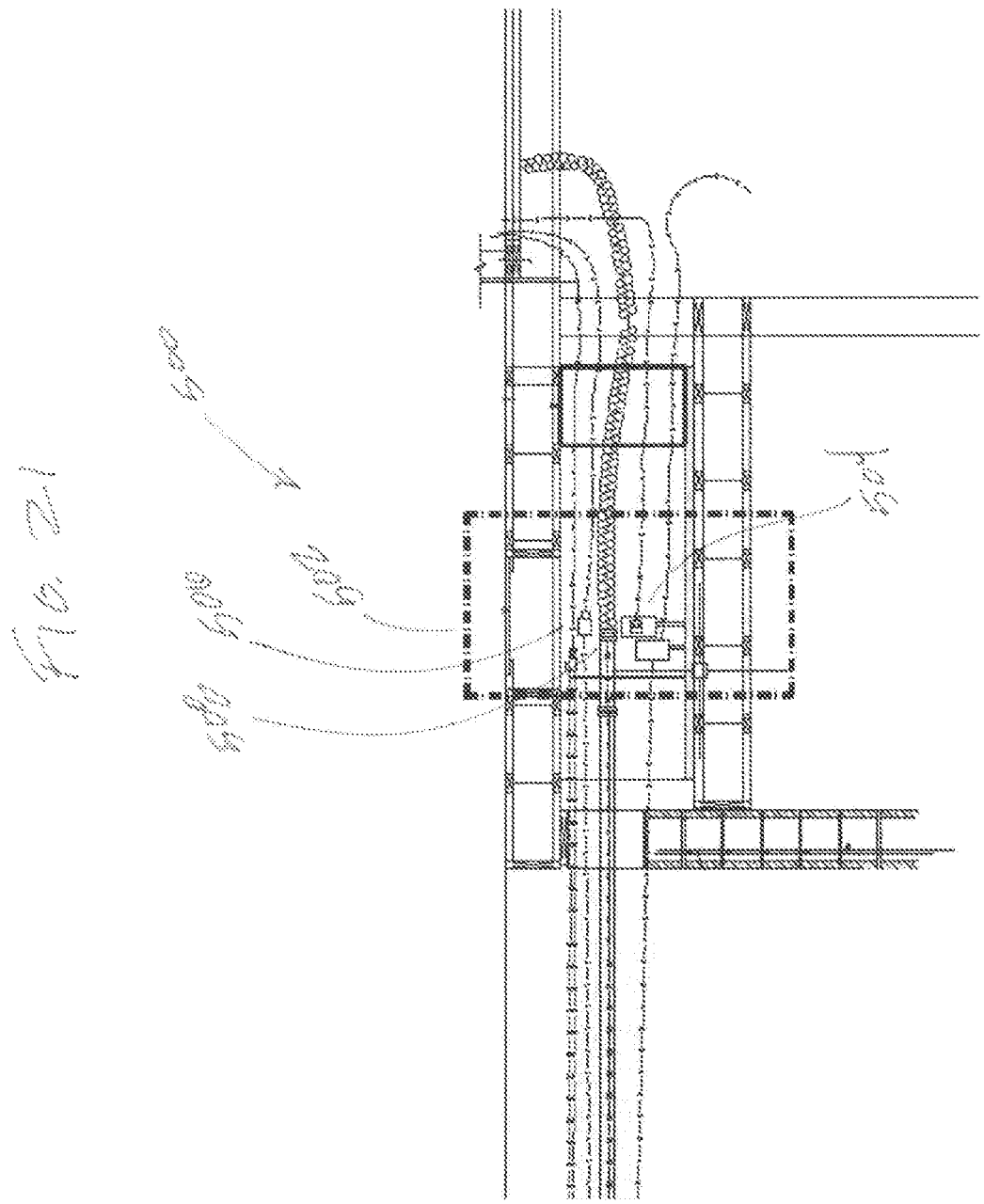

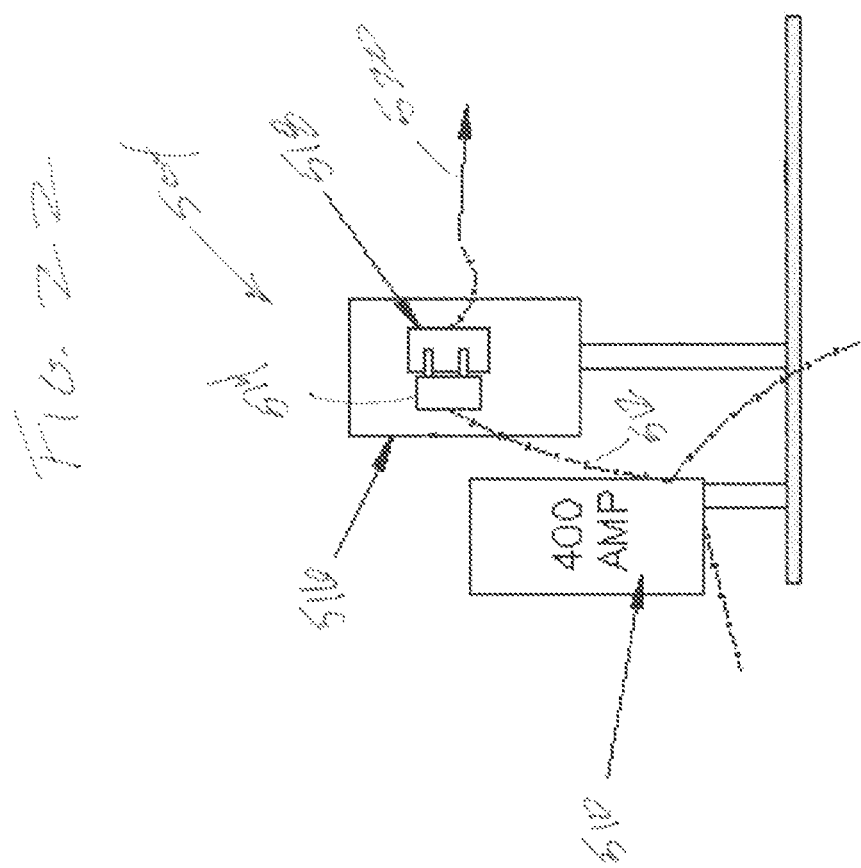

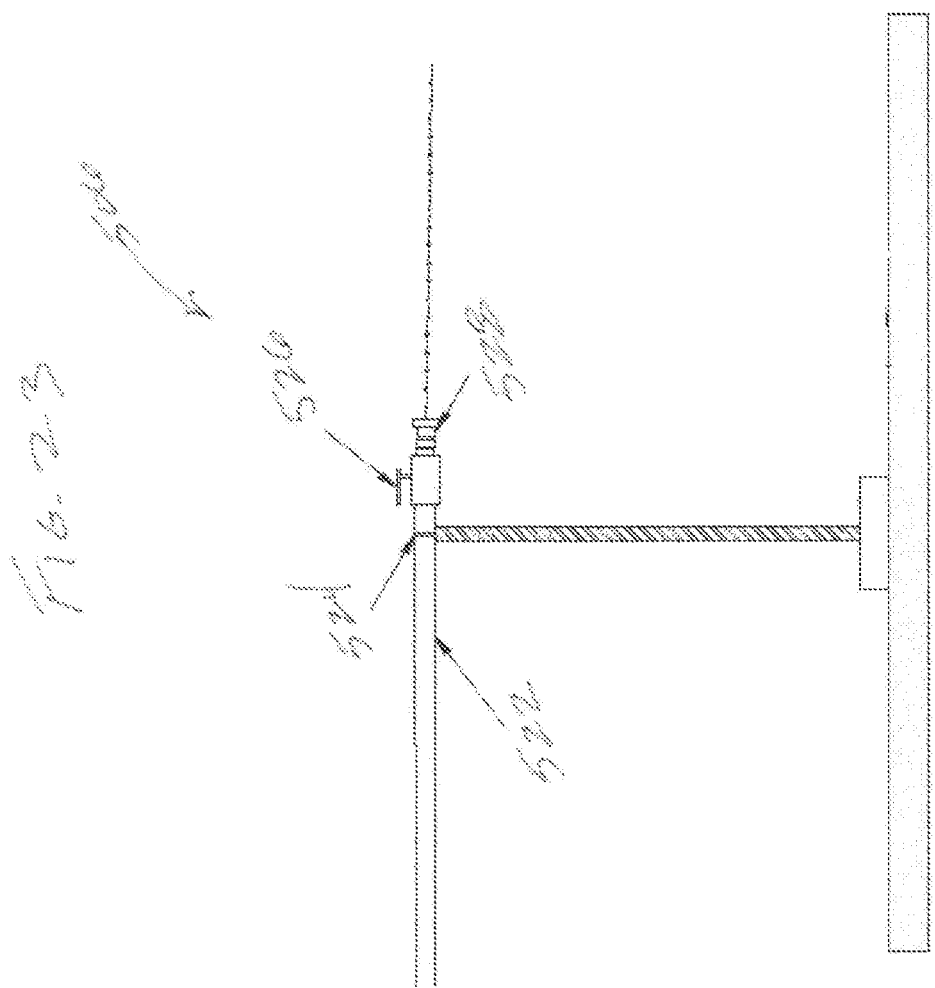

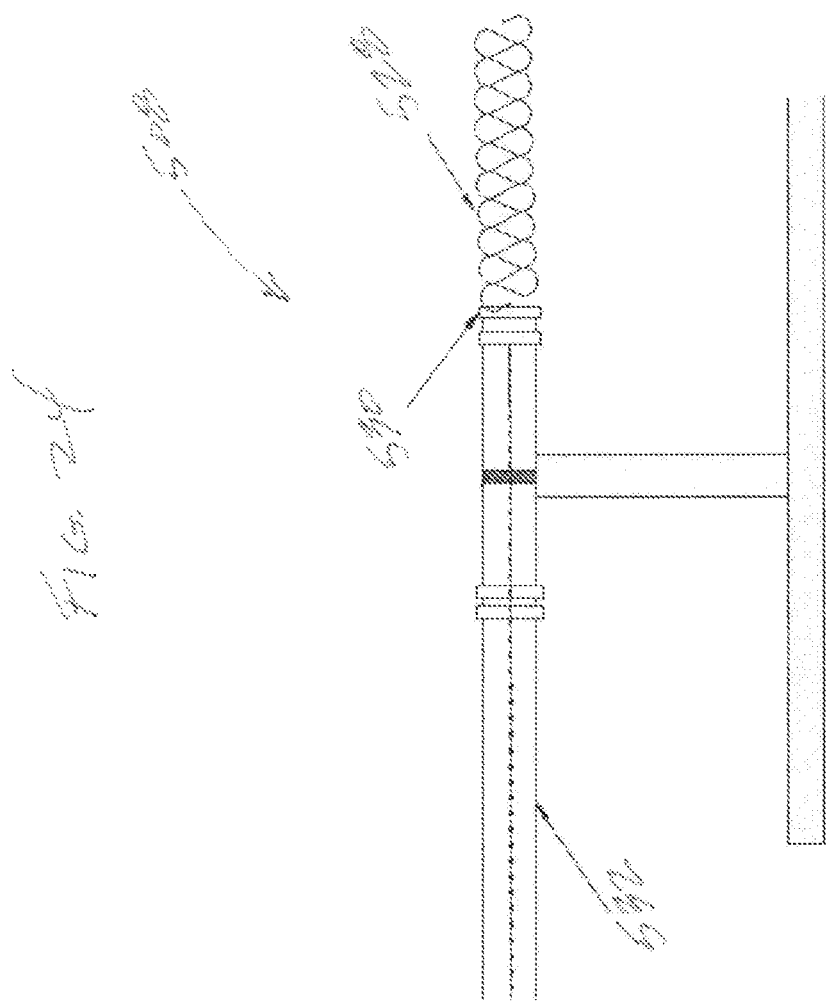

BUILDING STRUCTURE TRANSLATION SYSTEM AND METHOD

CROSS-REFERENCE TO RELATED APPLICATIONS

This application claims priority to U.S. Provisional Application No. 62/953,434 filed Dec. 24, 2019, the entire contents of which are hereby fully incorporated herein by reference for all purposes.

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention relates to building structures, including building structure systems adapted to translate from above grade positions to below grade positions.

BACKGROUND

The catastrophic destruction caused by wildfires, tornados, and hurricanes to residential homes and other types of building structures has become a worldwide crisis. In just the last decade, wildfires in California alone have resulted in over 170,000 homes destroyed, 1,000 dead, and over $120 billion in cash losses.

As is known in the art, one current method used to combat wildfires includes outdoor sprinkler systems that distribute water or fire prevention solutions (such as Class-A fire-rated foam or gel) onto the building when a wildfire is approaching. Another method is to use fire-resistant building materials to construct the homes. However, both of these methods typically fail due to a number of reasons. For instance, wildfires typically burn at over twice the temperatures that fire-resistant materials may withstand. In addition, many fire-resistant materials may lose their fire protection properties within a few hours, while wildfires may burn for days.

In addition, these types of systems provide no protection whatsoever against tornados, hurricanes, and other weather-related threats.

Accordingly, there is a need for a system and method that translates a building from an above grade position to a below grade position where it may be adequately protected during a wildfire or threatening weather-related event.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIGS. 1-3 show aspects of a building structure translation system assembly according to exemplary embodiments hereof;

FIG. 4 shows aspects of a base of a building structure translation system assembly according to exemplary embodiments hereof;

FIG. 5 shows aspects of a building structure translation system assembly according to exemplary embodiments hereof;

FIG. 6 show aspects of a scissor lift assembly according to exemplary embodiments hereof;

FIGS. 7-10 show aspects of a building structure translation system assembly according to exemplary embodiments hereof;

FIG. 11 shows aspects of a hydraulic lift according to exemplary embodiments hereof;

FIGS. 12-15 show aspects of a building structure translation system assembly according to exemplary embodiments hereof;

FIG. 16 shows aspects of a jack screw according to exemplary embodiments hereof;

FIG. 17 shows aspects of a building structure translation system assembly according to exemplary embodiments hereof;

FIGS. 18-20 show aspects of a protective cover assembly according to exemplary embodiments hereof;

FIGS. 21-24 show aspects of a quick release utility service system assembly according to exemplary embodiments hereof;

DETAILED DESCRIPTION OF EXEMPLARY EMBODIMENTS

As used herein, unless used otherwise, the following terms and abbreviations have the following meanings.

The term "building structure" will refer to any type of physical building structure including (without limitation), residential buildings, commercial buildings, homes, condominiums, apartment buildings, single-unit buildings, multi-unit buildings, educational buildings, institutional buildings, assembly buildings, business buildings, mercantile buildings, industrial buildings, storage buildings, wholesale establishments, mixed land use buildings, hazardous buildings, detached buildings, semi-detached buildings, multi-story or high-rise buildings, slums, unsafe buildings, special buildings, single-level car parking, multi-level car parking, other types of buildings and any combination thereof. Building structures also may include structures such as antennas, towers, bridges, overpasses, industrial pipes, telephone lines/poles, power lines/poles, communication lines/poles, utility lines/poles, traffic signals, other types of structures and any combination thereof. It is understood that a building structure may include a single building structure or multiple building structures.

It also is understood that while this specification may describe the system primarily in relation to its use with residential homes, the system may be applied to any types of building structures and the scope of the system is not limited in any way by the types of building structures that it may be applied to.

In general, the system according to exemplary embodiments hereof provides a system and method for translating building structures from at least one primary position to at least one secondary position. In some embodiments, a primary position may include a predominantly above grade position, and a secondary position may include a predominantly below grade position. For example, the system may translate a single-family home from an above grade position to a below grade position for protection of the home from wildfires, tornados, hurricanes, acts of war, other types of harmful circumstances and any combination thereof.

Overview

Figure 25:
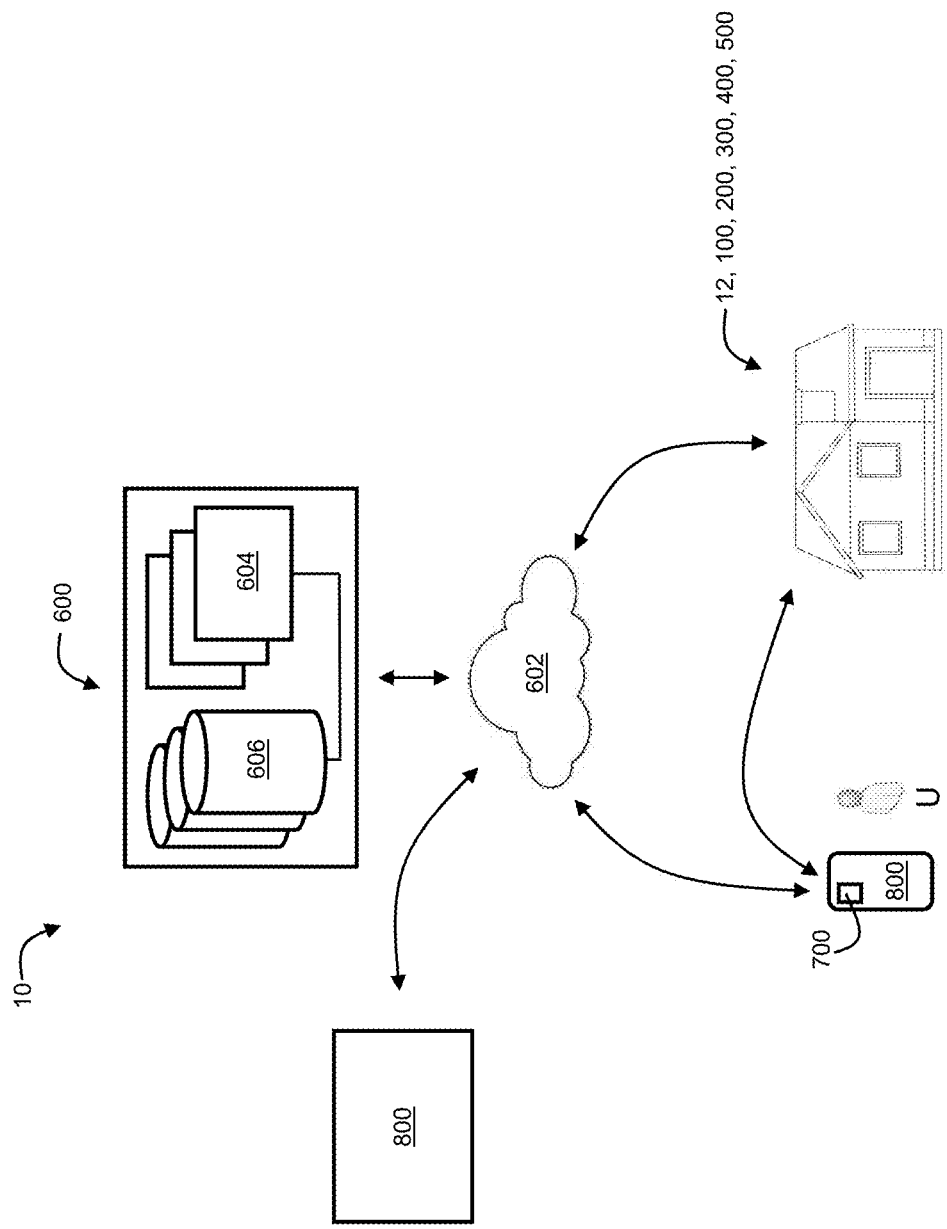
FIG. 25 show aspects of a building structure translation system assembly according to exemplary embodiments hereof.

In some exemplary embodiments as shown in FIG. 1, the building structure translation system 10 (also referred to as simply the system 10) includes a base structure assembly 100, a receiving structure 200, and a building structure translation assembly 300. The system 10 also may include an upper protective assembly 400, and a quick release utility system 500. The system 10 also may include a backend system 600, and an application 700 as shown in FIG. 25. The system 10 also may include other systems, assemblies, and elements necessary for the system 10 to perform its functionalities.

In some embodiments as shown in FIGS. 1-2, the base structure assembly 100 may provide a base or foundation for a building structure 12 (e.g., a single family home) and the receiving structure 200 may include a lower space and the necessary elements to receive (i) the base structure assembly 100, and (ii) the building structure 12 supported by the base structure assembly 100. The building structure translation assembly 300 may be adapted to move the base assembly 100 and the building structure 12 from a primary position (e.g., the above grade position shown in FIG. 1) to a secondary position (e.g., the below grade position shown in FIG. 2). In general, the primary position is predominantly above the ground level 14 and the secondary position is predominantly below ground level 14. However, it is understood that the primary position may include only a portion of the building structure 12 being above grade, and the secondary position may include only a portion of the building structure 12 being below grade.

In some embodiments, the protective assembly 400 may be adapted to generally cover the space above the building structure 12 when the building structure 12 is positioned in the secondary position (e.g., in the below grade position). In this way, the building structure 12 may be protected from above grade elements such as wildfires, tornados, hurricanes, acts of war and/or other types of threatening above grade elements.

The dimensions of each assembly 100, 200, 300, 400 and the proportional size of each assembly 100, 200, 300, 400 with respect to each other assembly 100, 200, 300, 400 and/or with respect to the building structure 12 may be chosen to ensure that the system 10 may perform its functionalities for each corresponding building structure 12 used with the system 10.

In some embodiments, the quick release utility system 500 provides a system and method to quickly shutdown and terminate utility elements (e.g., electrical, water, sewer, and other type of utilities) during an emergency and prior to the translation of the building 12.

In some embodiments, the backend system 600 and the application 700 enables the system 10 to interface with its elements as well as the user (e.g., homeowner) and third-party entities (e.g., fire departments).

Referring now to FIGS. 1-28, the building structure translation system 10 (also referred to as simply the system 10) according to exemplary embodiments hereof will be described in further detail.

Base Structure Assembly 100

In some embodiments as shown in FIGS. 1-2, the base structure assembly 100 is adapted to support at least a portion of (and preferably the entirety of) a building structure 12. The base structure assembly 100 may support a building structure 12 in at least one primary position (e.g., above grade), in at least one secondary position (e.g., below grade), and during any translation of the building structure 12 from the at least one primary position to the at least one secondary position.

In some embodiments, the base structure assembly 100 includes at least one foundation 102 adapted to support the building structure 12. As shown in FIG. 3, the foundation 102 may include a foundation top 104 and a foundation bottom 106, with the top 104 adapted to be coupled to the building structure 12.

In some embodiments as shown in FIG. 4, the foundation 102 includes a left side 108, a right side 110, a front side 112, and a back side 114. While the base structure assembly 100 and the foundation 102 are depicted in FIG. 4 as generally rectangular, the base structure assembly 100 and/or the foundation 102 may be formed as other shapes as required by the system 10 and the building structure 12. Note that the shape of the base structure assembly 100 and the shape of the foundation 102 need not match. It is understood that the scope of the system 10 is not limited in any way by the shape of the base structure assembly 100 or the by the shape of the foundation 102.

In some embodiments, the foundation 102 includes support structures such as lateral beams 109 that run from the left side 108 to the right side 110, from the front side 112 to the back side 114, diagonally, in any other orientations and directions with respect to the foundation 102, in any portions thereof, and in any combinations thereof. In some embodiments, the beams 109 are coupled to the top 104 of the foundation, to the bottom 106 of the foundation, configured to pass through the body of the foundation 102, and/or in any combinations thereof. The beams 110 may comprise metal, wood, composite materials, plastics, any other suitable materials, and any combinations thereof.

In some embodiments, the foundation 102 includes one or more perimeter supports 111 (e.g., a frame) that extend peripherally about at least a portion of the foundation's outer perimeter.

In some embodiments, the lateral beams 109 and/or the perimeter supports 111 not only provide additional strength and support to the foundation 102, but also may facilitate the coupling of the foundation 102 to the building structure 12 (e.g. on the foundation's top 104) and/or to the translation assembly 300 (e.g., to the foundation's bottom 106).

The top 104 of the foundation 102 is adapted to be coupled with the building structure 12 (preferably fixedly) and preferably includes all necessary elements as known in the art to adequately do so (e.g., anchor bolts).

The bottom 106 of the foundation 102 is adapted to be coupled with the top of the building structure translation assembly 300 and preferably includes all necessary elements as known in the art to adequately do so (e.g., anchor bolts). In some embodiments, the top of the building structure translation assembly 300 (or portions thereof) is fixedly attached to the bottom 106 of the foundation 102, while in other embodiments, the top of the translation assembly 300 (or portions thereof) is coupled with the bottom 106 of the foundation 102 in a way that allows movement of the foundation 102 and/or of the translation assembly 300 relative to one another. This may depend on the type of translation assembly 300 as described in other sections.

In some embodiments, the base structure assembly 100 includes one foundation 102 while in other embodiments, the base structure assembly 100 includes two or more foundations 102 (depending on the building structure(s) 12 used with the system 10).

In some embodiments, each foundation 102 is a concrete and/or or reinforced masonry foundation 102. The foundation 102 may include an air entrained foundation with a minimum compressive strength as required by the weight, size, and type of the building structure(s) 12. For example, the foundation(s) 102 may include a minimum compressive strength at 28 days of at least 3000 psi. Other types of foundations 102 with adequate specifications also may be used, and it is understood that the scope of the system 10 is not limited in any way by the type of foundation(s) 102 employed.

Receiving Structure 200

In some embodiments as shown in FIGS. 3 and 5, the receiving structure 200 includes a structure including an inner volume 202 (e.g., a space) adapted to receive at least a portion of (i) the base structure assembly 100, and (ii) the building structure 12. In some embodiments, it is preferred that the inner volume 202 is adapted to receive the entirety of the base structure assembly 100 and the building structure 12, but this may not be required in all implementations. In some embodiments, the inner volume 202 includes a below grade space such as a basement as shown in FIG. 3.

In some embodiments, the receiving structure 200 may include a left side 204, a right side 206, a front side 208, a back side 210, and a bottom 212. While the receiving structure 200 is depicted in FIG. 5 as having a generally rectangular top cross section, the receiving structure 200 may be formed as other shapes as required by the system 10 and/or the building structure 12. In general, it may be preferred that the top cross sectional shape of the receiving structure 200 generally correspond to the top cross sectional shape of the base structure assembly 100 so that the base structure assembly 100 may fit within the receiving structure 200 without large gaps or obstructions. It is understood that the scope of the system 10 is not limited in any way by the shape or form of the receiving structure 200.

In some embodiments, the inner volume 202 is generally aligned along a vertical axis with the base structure assembly 100 and with the foundation 102. In this way, the base structure assembly 100 and its foundation 102 may be translated vertically into and out of the inner volume 202.

The sides 204, 206, 208, 210 may include foundational walls built to building code specifications as known in the art or otherwise. For example, the sides 204, 206, 208, 210 may include 18" thick dampproofed concrete or reinforced masonry walls. Other types of walls also may be employed. In some embodiments, the sides 204, 206, 208, 210 also may include one or more vertical beams (e.g., in each corner) for additional vertical support. In some embodiments, the sides 204, 206, 208, 210 also may include one or more horizontal beams for additional lateral support. The vertical and/or horizontal beams may comprise steel or other suitable materials.

The bottom 212 may include one or more foundations 214 (comprising concrete, reinforced masonry, or other suitable materials) with a minimum compressive strength as required by the weight, size, and type of the building structure(s) 12. For example, the foundation(s) 214 may include an air entrained foundation with a minimum compressive strength at 28 days of at least 3000 psi. Other types of foundations 214 with adequate specifications also may be used, and it is understood that the scope of the system 10 is not limited in any way by the type of foundation(s) 214 employed.

In general, the bottom 212 of the receiving structure 200 is designed, adapted, and configured to support the building structure translation assembly 300, the base structure assembly 100 supported by the building structure translation assembly 300, and the building structure 12 supported by the base structure assembly 100. In this way, the system 10 may translate the building structure 12 from a primary position (e.g., an above grade position) to a secondary position (e.g., a below grade position) without incurring any significant deformation of the receiving structure 200, its bottom 212 and/or the foundation 214.

In some embodiments, the receiving structure 200 includes guide rails and/or other types of guide structures that may support and guide the base structure assembly 100 and/or the building structure 12 as the assembly 100 and/or the building structure 12 may be translated using the building structure translation assembly 300.

Building Structure Translation Assembly 300

In some embodiments as shown in FIGS. 1-2, the building structure translation assembly 300 is adapted to support the base structure assembly 100 and the building structure 12 it may support, and to translate the base structure assembly 100 and the building structure 12 from a primary position (e.g., an above grade position as shown in FIG. 1) to a secondary position (e.g., a below grade position as shown in FIG. 2) and subsequently, back to the primary position (e.g., an above grade position as shown in FIG. 1). For example, the building structure translation assembly 300 may lower a single-family home 12 from an above grade position during the threat of a wildfire to a below grade position where the home 12 may be protected. Then, after the danger has subsided, the building structure translation assembly 300 may raise the home 12 back up to its original above grade position for use.

In general, the building structure translation assembly 300 may retract, compress, or otherwise reduce its height while translating the building structure 12 from the primary position to the secondary position, and then may subsequently extend, expand or otherwise increase its height while translating the building structure 12 from the secondary position to the primary position. For the purposes of this specification, the building structure translation assembly 300 will be referred to as being in its extended configuration when the building structure 12 is in the primary position, and as being in it retracted configuration when the building structure 12 is in the secondary position.

In some embodiments, the depth of the inner volume 202 is chosen to be generally equal to or slightly greater than the height of the building structure 12 plus the height of the building structure translation assembly 300 when in its retracted configuration. In this way, the building structure 12 and the translation assembly 300 may fit entirely within the inner volume 202 when the translation assembly 300 is in its retracted configuration. In some embodiments, the height of the translation assembly 300 when in its retracted configuration may be about 2' to 3' or preferably about 2.75'. Other heights also may be used.

Note that the building structure translation assembly 300 of FIGS. 1-2 is represented as a block for demonstration and to represent that the assembly 300 may take any number of forms and/or architectures. However, it is understood that this representation of the assembly 300 is not meant to indicate its actual dimensions, forms, shapes, proportions with respect to other elements of the system 10 and/or other defining characteristics of the assembly 300.

In some embodiments, the building structure translation assembly 300 may include at least some of the following (without limitation):
1. One or more types of scissor lift systems 302 comprising one or more scissor lift units 304;
2. One or more types of hydraulic lift systems 306 comprising one or more hydraulic lift units 308;
3. One or more types of jackscrew lift systems 310 comprising one or more jackscrew lift units 312;
4. Other types of lift systems; and
5. Any combinations of any types of lift systems.

In some embodiments, the building structure translation systems 302, 306, 310 (or others) are controlled by system controllers as is known in the art.

Additional details of these lift systems are provided below.

Scissor Lift Systems 302

In some embodiments as shown in FIG. 6 and as known in the art, a scissor lift unit 304 may include opposing scissor arm sets 314, with each scissor arm set 314 including at least one first arm 316 and at least one second arm 318. The first arm 316 and the second arm 318 are rotatably coupled at the pivot point $P_1$ as shown. The first scissor arm set 314 and the second scissor arm set 314 may be coupled by one or more cross supports 320 extending between the scissor sets 314. While this description depicts the scissor arm sets 314 as including two arms each, it is understood the scissor arm sets 314 may include additional arms as required.

A lower end of the first arm 316 is rotatably coupled to the base 322 at the pivot point $P_2$, and an upper end of the second arm 318 is rotatably coupled to the upper platform 324 at the pivot point $P_3$. A top end of the first arm 316 is moveably coupled to the upper platform 324 and is adapted to move in the direction of arrow $A_1$ and/or in the direction of arrow $A_2$ (e.g., via bearing wheels within channels or other movement mechanisms). A lower end of the second arm 318 is moveably coupled to the base 322 and is adapted to move in the direction of arrow $A_3$ and/or in the direction of arrow $A_4$ (e.g., via bearing wheels within channels or using other movement mechanisms). In this way, the upper end of the first arm 316 and the lower and of the second arm 318 may move in the directions of $A_1$, $A_3$, respectively, while the lower end of the first arm 316 and the upper end of the second arm 318 pivot at pivot points $P_2$, $P_3$, respectively, to lower the upper platform 324 with respect to the base 322 as shown by arrow $M_1$. In addition, the upper end of the first arm 316 and the lower and of the second arm 318 may move in the directions of $A_2$, $A_4$, respectively, while the lower end of the first arm 316 and the upper end of the second arm 318 pivot at pivot points $P_2$, $P_3$, respectively, to raise the upper platform 324 with respect to the base 322 as shown by arrow $M_2$.

It is understood that the second scissor arm set 314 opposing the first scissor set 314 and coupled with the first scissor set 314 via the cross supports 320 may operate in a similar manner, and in order to avoid duplicative information, the description of this need not be provided.

The above described movement may be caused by one or more movement mechanisms 326 coupled with the first and second arms 316, 318, with the cross supports 320, or in other arrangements as is known in the art. The movement mechanisms 326 may include, without limitation, hydraulic pistons, motors, pulley systems, other types of movement mechanisms 320 and any combination thereof.

When the upper end of the first arm 318 and the lower end of the second arm 318 are moved in the direction of arrows A1, A3, respectively, to their full extent as defined by the specifications of the unit 304, the height of the scissor lift unit 304 is equal to the "retracted length". When the upper end of the first arm 318 and the lower end of the second arm 318 are moved in the direction of arrows A2, A4, respectively, to their full extent as defined by the specifications of the unit 304, the height of the scissor lift unit 304 is equal to the "extended length". The extended length is equal to the retracted length plus the "stroke" of the scissor lift unit 304. The stroke is defined as the aggregate distance that the scissor lift unit 304 may extend from the retracted length when fully extended. As is known in the art, the scissor lift unit 304 may be controlled to extend any amount between the retracted length and the extended length. The scissor lift unit 304 may include other components and/or elements (e.g., actuators, lead screws, motors, etc.) as necessary to fulfill its functionalities.

The orientation of the scissor lift unit 304 as shown in FIG. 6 and as described above will be referred to as a left-to-right orientation signifying that the upper end of the first arm 316 and the lower end of the second arm 318 generally move from the left to the right as the scissor lift unit 304 lowers its upper platform 324.

Given this, it is appreciated that (i) the orientation of a scissor lift unit 304 in the left-to-right orientation and rotated 180° about an axis perpendicular to its upper platform 324 will be referred to as a right-to-left orientation, (ii) the orientation of a scissor lift unit 304 in the left-to-right orientation and rotated 90° clockwise about an axis perpendicular to its upper platform 324 will be referred to as a back-to-front orientation, and (iii) the orientation of a scissor lift unit 304 in the left-to-right orientation and rotated 270° clockwise about an axis perpendicular to its upper platform 324 will be referred to as a front-to-back orientation.

Additional embodiments and details of the building structure translation assembly 300 and/or the scissor lift system 302 will be described by way of several detailed examples. The examples provided below are chosen to illustrate various embodiments and implementations of the building structure translation assembly 300 and/or of the scissor lift system 302, and those of ordinary skill in the art will appreciate and understand, upon reading this description, that the examples are not limiting and that the building structure translation assembly 300 and/or the scissor lift system 302 may be used in different ways. It is also understood that details of different embodiments described in different examples may be combined in any way to form additional embodiments that are all within the scope of the system 10.

Dual Scissor

In one embodiment as shown in FIGS. 7-8, the building structure translation assembly 300 includes a scissor lift system 302 comprising a total of two scissor lift units 304-1, 304-2, with each unit 304 including two scissor arm sets 314, and each scissor arm set 314 including a first arm 316 and a second arm 318 as described above. The top platform 324 of each unit 304-1, 304-2 is fixedly coupled with the bottom 106 of the base structure assembly's foundation 102, and the base 322 of each unit 304-1, 304-2 is fixedly coupled with the top 212 of the receiving assembly's foundation 214. Note that FIG. 8 depicts the scissor lift units 304 as below the foundation 102 and viewable through the foundation 102 in order to show the details of the units 304. However, it is understood that in actual implementations the foundation 102 may be solid and that the scissor lift units 304 may not be viewable from above the foundation 102.

In some embodiments, a first scissor lift unit 304-1 is oriented in a left-to-right orientation and is positioned near the front 112 of the base structure assembly 100 and its foundation 102, and closer to the left side 108 of the foundation 102 compared to the right side 110 of the foundation 102. A second scissor lift unit 304-2 is oriented in a right-to-left orientation and is positioned near the back 114 of the base structure assembly 100 and its foundation 102, and closer to the right side 110 of the foundation 102 compared to the left side 108 of the foundation 102.

Quad Scissor

In one embodiment as shown in FIGS. 9-10, the building structure translation assembly 300 includes a scissor lift system 302 comprising a total of four scissor lift units 304-1, 304-2, 304-3, 304-4, with each unit 304 including two scissor arm sets 314, and each scissor arm set 314 including a first arm 316 and a second arm 318 as described above. The top platform 324 of each unit 304-1, 304-2, 304-3, 304-4 is fixedly coupled with the bottom 106 of the base structure assembly's foundation 102, and the base 322 of each unit 304-1, 304-2, 304-3, 304-4 is fixedly coupled with the top 212 of the receiving assembly's foundation 214. Note that FIG. 10 depicts the scissor lift units 304 as below the foundation 102 and viewable through the foundation 102 in order to show the details of the units 304. However, it is understood that in actual implementations the foundation 102 may be solid and that the scissor lift units 304 may not be viewable from above the foundation 102.

In some embodiments, a first scissor lift unit 304-1 is oriented in a left-to-right orientation and is positioned near the front 112 of the base structure assembly 100 and its foundation 102, and closer to the left side 108 of the foundation 102 compared to the right side 110 of the foundation 102. The first scissor lift unit 304-1 may be positioned in the front 112 left 108 corner of the foundation 102 with or without a relief.

A second scissor lift unit 304-2 is oriented in a front-to-back orientation and is positioned near the front 112 of the base structure assembly 100 and its foundation 102, and closer to the right side 100 of the foundation 102 compared to the left side 108 of the foundation 102. The second scissor lift unit 304-2 may be positioned in the front 112 right 110 corner of the foundation 102 with or without a relief.

A third scissor lift unit 304-3 is oriented in a right-to-left orientation and is positioned near the back 114 of the base structure assembly 100 and its foundation 102, and closer to the right side 100 of the foundation 102 compared to the left side 108 of the foundation 102. The third scissor lift unit 304-3 may be positioned in the back 114 right 110 corner of the foundation 102 with or without relief.

A fourth scissor lift unit 304-4 is oriented in a back-to-front orientation and is positioned near the back 114 of the base structure assembly 100 and its foundation 102, and closer to the left side 108 of the foundation 102 compared to the right side 110 of the foundation 102. The fourth scissor lift unit 304-4 may be positioned in the back 114 left 108 corner of the foundation 102 with or without a relief.

In some embodiments as shown in FIGS. 9-10, the system 10 includes a fire suppression system 350 or similar. The fire suppression system 350 may distribute a fire suppression element (e.g., Halon foam and/or other fire suppression chemicals) onto the protective assembly 400 and about its perimeter after the system 10 has translated a building structure 12 to a below grade position and the protective assembly 400 has been deployed.

The fire suppression system 350 may include one or more tanks 352 for storing the fire suppression element (e.g., Halon or other fire suppressant chemical and/or foam), a piping system 354 for delivering the fire suppression element, and a nozzle assembly 356 for releasing the fire suppression element and directing it to its desired locations. In some embodiments, the nozzle assembly 356 includes one or more nozzles 358 directed inward (towards the protective cover 402 covering the inner volume 202) and one or more nozzles 358 directed outward (away from the protective cover 402 covering the inner volume 202). In this way, the nozzle assembly 356 may distribute the fire suppression element onto the protective assembly 400 covering the top of the inner volume 202 (described below) and around the general perimeter of the system 10. In some embodiments, the nozzle assembly 356 may release the fire suppression element at a 45° angle (and/or at other suitable angles). In some embodiments, the nozzle assembly 356 may include one or more shrouds or hoods to protect the nozzles 358 from outdoor elements.

While the fire suppression system 350 has been described here in relation to an embodiment of the system 10 that includes a scissor lift system 302 comprising a total of four scissor lift units 304-1, 304-2, 304-3, 304-4, it is understood that this is meant for demonstration and that any embodiment of the system 10 described herein or otherwise may include a fire suppression system 350.

It also is understood that the above examples are meant for demonstration and that the scissor lift systems 302 may include any number of scissor lift units 304 in any positions and/or orientations with respect to one another and to the other elements of the overall system 10.

Hydraulic Lift Systems 306

In some embodiments as shown in FIG. 11 and as known in the art, a hydraulic lift unit 308 may include one or more stages 326-1, 326-2, 326-3, . . . 326-$n$ (collectively and individually 326). The stages 326 may be configured telescopically so that the stages 326 may extend from one another and/or retract into one another as is known in the art. Other types of stages 326 (e.g., folding) also may be used. When the stages 326 are all fully retracted (in the direction of arrow $M_3$), the height of the hydraulic lift unit 308 is equal to the "retracted length". When the stages 326 are fully extended (in the direction of arrow $M_4$), the height of the lifting column is equal to the "extended length". The extended length is equal to the retracted length plus the "stroke" of the hydraulic lift unit 308. The stroke is defined as the aggregate distance that the combined stages 326 may extend from the retracted length when fully extended. As is known in the art, the hydraulic lift unit 308 may be controlled to extend any amount between the retracted length and the extended length. The hydraulic lift unit 308 may include other components and/or elements (e.g., actuators, lead screws, motors, etc.) as necessary to fulfill its functionalities. The hydraulic lift unit 308 may utilize hydraulic, pneumatic, other types of actuators and/or devices and any combination thereof.

Additional embodiments and details of the building structure translation assembly 300 and/or the hydraulic lift system 306 will be described by way of several detailed examples. The examples provided below are chosen to illustrate various embodiments and implementations of the building structure translation assembly 300 and/or of the hydraulic lift system 306, and those of ordinary skill in the art will appreciate and understand, upon reading this description, that the examples are not limiting and that the building structure translation assembly 300 and/or the hydraulic lift system 306 may be used in different ways. It is also understood that details of different embodiments described in different examples may be combined in any way to form additional embodiments that are all within the scope of the system 10.

In some embodiments, the hydraulic lift system 306 may include one hydraulic lift unit 308, two hydraulic lift units 308, three hydraulic lift units 308, four hydraulic lift units 308, five hydraulic lift units 308, six hydraulic lift units 308, seven hydraulic lift units 308, eight hydraulic lift units 308, nine hydraulic lift units 308, ten hydraulic lift units 308 or more. It is understood that the hydraulic lift system 306 may include any number of hydraulic lift units 308 and that the scope of the system 10 is not limited in any way by the number of hydraulic lift units 308 it may employ. In addition, any hydraulic lift unit(s) 308 utilized by the system 10 need not necessarily match any other hydraulic lift unit(s) 308 used by the system 10.

In one embodiment as shown in FIGS. 12-13, the hydraulic lift system 306 includes a total of five hydraulic lift units 308-1, 308-2, 308-3, 308-4, 308-5. The top each unit 308 is fixedly coupled with the bottom 106 of the base structure assembly's foundation 102, and in some embodiments, is coupled to the base structure assembly's bottom 106 via a support pad 328 (e.g., concrete block, steel section, reinforced concrete section, etc.). The bottom of each unit 308 is fixedly coupled with the receiving assembly's foundation 214. Note that in some embodiments, one or more lower stages 326 of the hydraulic lift unit 308 may extend below the top 212 of the receiving assembly's foundation 214, and that the foundation 214 may include holes 330 to accommodate this.

In some embodiments as shown in FIG. 13, a first hydraulic lift unit 308-1 is positioned generally in the front 112 left 108 corner, with or with out relief, a second hydraulic lift unit 308-2 is positioned generally in the front 112 right 110 corner, with or without relief, a third hydraulic lift unit 308-3 is positioned generally in the middle of the base structure assembly's foundation 102, a fourth hydraulic lift unit 308-4 is positioned generally in the back 114 left 108 corner, with or without relief, and a fifth hydraulic lift unit 308-5 is positioned generally in the back 114 right 110 corner, with or without relief.

In one embodiment as shown in FIGS. 14-15, the hydraulic lift system 306 includes a total of four hydraulic lift units 308-1, 308-2, 308-3, 308-4. The top each unit 308 is fixedly coupled with the bottom 106 of the base structure assembly's foundation 102, and in some embodiments, is coupled to the base structure assembly's bottom 106 via a support pad 328 (e.g., concrete block, steel section, reinforced concrete section, etc.). The bottom of each unit 308 is fixedly coupled with the receiving assembly's foundation 214.

In some embodiments as shown in FIG. 15, a first hydraulic lift unit 308-1 is positioned generally in the front 112 left 108 corner, with or without relief, a second hydraulic lift unit 308-2 is positioned generally in the front 112 right 110 corner, with or without relief, a third hydraulic lift unit 308-3 is positioned generally in the back 114 left 108 corner, with or without relief, and a fourth hydraulic lift unit 308-4 is positioned generally in the back 114 right 110 corner, with or without relief.

It is understood that the above examples are meant for demonstration and that the hydraulic lift systems 306 may include any number of hydraulic lift units 308 in any positions and/or orientations with respect to one another and to the other elements of the overall system 10.

Jackscrew Lift Systems 310

In some embodiments as shown in FIG. 16 and as known in the art, a jackscrew lift unit 312 may include one or more stages 332-1, 332-2, 332-3, . . . 332-$n$ (collectively and individually 332). The stages 332 may be configured telescopically so that the stages 332 may extend from one another and/or retract into one another as is known in the art. The jackscrew lift unit 312 and its stages 332 may include leadscrews used as linkages to translate turning motion to linear motion within each unit 312.

When the stages 332 are all fully retracted (in the direction of arrow $M_5$), the height of the jackscrew lift unit 312 is equal to the "retracted length". When the stages 332 are fully extended (in the direction of arrow $M_6$), the height of the lifting column is equal to the "extended length". The extended length is equal to the retracted length plus the "stroke" of the jackscrew lift unit 312. The stroke is defined as the aggregate distance that the combined stages 332 may extend from the retracted length when fully extended. As is known in the art, the jackscrew lift unit 312 may be controlled to extend any amount between the retracted length and the extended length. The jackscrew lift unit 312 may include other components and/or elements (e.g., actuators, motors, etc.) as necessary to fulfill its functionalities.

In some embodiments, the jackscrew lift system 310 may be used to translate the building structure 12 from a principle position to a secondary position, and subsequently, back to the primary position. In other embodiments, the jackscrew lift system 310 may be used to facilitate the safe translation of the building structure 12 from the primary position (e.g., above grade position) to the secondary position (e.g., below grade position), and may not be meant to perform the subsequent translation of the building structure 12 from the secondary position back to the primary position. As explained below, the return of the building structure to its primary position may be facilitated using a separate system.

In some embodiments, the jackscrew lift system 310 may include one jackscrew lift unit 312, two jackscrew lift units 312, three jackscrew lift units 312, four jackscrew lift units 312, five jackscrew lift units 312, six jackscrew lift units 312, seven jackscrew lift units 312, eight jackscrew lift units 312, nine jackscrew lift units 312, ten jackscrew lift units 312 or more. It is understood that the jackscrew lift system 310 may include any number of jackscrew lift units 312 and that the scope of the system 10 is not limited in any way by the number of jackscrew lift units 312 it may employ. In addition, any jackscrew lift unit(s) 312 utilized by the system 10 need not necessarily match any other jackscrew lift unit(s) 312 used by the system 10.

In some embodiments as shown in FIG. 17, the jackscrew lift system 310 may include a total of four jackscrew lift units 312, and the positioning of the jackscrew lift units 312 may match or closely resemble the positioning of the five hydraulic lift units 308 as described above with respect to FIG. 15.

In some embodiments, the jackscrew lift system 310 may include a total of five jackscrew lift units 312, and the positioning of the jackscrew lift units 312 may match or closely resemble the positioning of the four hydraulic lift units 308 as described above with respect to FIG. 13.

Accordingly, any of the details described in other sections relating to the hydraulic lift system 306 and/or the hydraulic lift units 308 also may pertain to the jackscrew lift system 310 and/or the jackscrew lift units 312.

In some embodiments, the jackscrew lift system 310 may facilitate the safe translation of the base structure assembly 100 and the building structure 12 it may support from a primary position (e.g., above grade) to a secondary position (e.g., below grade). This translation may be driven predominantly by gravity with the jackscrew lift system 310 functioning as a braking system to regulate the speed of the translation process. For example, in some embodiments, the jackscrew units 312 may be electrical only so that the units 312 may retract under pressure/power as a built-in braking system. In this way, when the jackscrew lift system 310 is activated to facilitate the lowering of the building structure 12, it may release and regulate the building structure's downward motion within the building structure receiving assembly 200. This may ensure a safe translation while preserving the integrity of the building structure 12. In this embodiment, the jackscrew lift system 310 may be referred to as a drop system. It is understood that other types of lift systems such as the scissor lift system 302, the hydraulic lift system 306, and/or other types of lift systems also may be used for this purpose.

In some embodiments, the jackscrew lift system 310 does not facilitate the translation process to return the building structure 12 to the primary position. Instead, a secondary system such as a crane may be used for this translation. Accordingly, the building structure translation system 300 may include a crane lifting system 334 that may include columns 336 extending from the base structure assembly's fountain 102 to attachment members 338 (e.g., hooks, loops, etc.) accessible from above the building structure 12 (e.g., at the building structure's roof). The columns 336 may comprise steel or other suitable materials and may preferably extend from the bottom of the base structure assembly's foundation 102 through the building structure 12 to the attachment members 338 above. A crane 340 may then be adapted to couple with the attachment members 338 and lift the base structure assembly 100, its foundation 102 and/or the building structure 12 upward from the secondary position to the primary position. Once at the primary position, the jackscrew lift system 310 may be engaged and locked thereby locking the base structure assembly 100 and the building structure 12 at the primary position. Other locking mechanisms also may be used for this purpose.

Upper Protective Assembly 400

In some embodiments as shown in FIGS. 18-20, the upper protective assembly 400 includes a retractable roof 402 that may translate from a first configuration to a second configuration. In some embodiments, the first configuration may be a retracted configuration that compactly stores the retractable roof 402 when not in use. The second configuration may be a fully extended configuration that generally covers the top of the inner volume 202 of the receiving structure 200 to protect elements within the inner volume 202 (e.g., a building structure 12). In this way for example, once the building structure 12 has been lowered into the below grade position, the retractable roof 402 may be extended to cover the top of the inner volume 202 thereby protecting the submerged building structure 12 from above grade threats such as wildfires.

In one embodiment as shown in FIG. 18, the retractable roof 402 includes one or more hingedly coupled slats 404 that may fold upon one another when the roof 402 is in its retracted configuration (thereby being compact) and that may open into side-by-side configurations when extended (thereby forming a generally linear roof structure). The slats 404 may each include a first end moveably coupled to a first guide rail 406 (e.g., via rollers) and a second end moveably coupled to a second guide rail 406 (e.g., via rollers). The guide rails 406 are generally parallel with one another with the first rail 406 generally extending from the left 204 to the right 206 of the inner volume 202 along its top back side 210, and with the second rail 406 generally extending from the left 204 to the right 206 of the inner volume along its top front side 208.

In this configuration, the slats 404 may be moved to the far right 206 (e.g., in the direction of the arrow $M_7$) into a folded and compact configuration within a housing 408 for storage. The housing 408 may comprise a compartment (such as a box) that may be positioned above ground, below ground, or in a combination thereof. To deploy the retractable roof 402, the slats 404 may then be spread out side-by-side (e.g., in the direction of arrow $M_8$) to extend from the far right 206 to the far left 204 as shown in FIG. 18.

In some embodiments, the roof 402 is fire resistant and/or fire retardant. It is preferable that the roof 402 comprise a material and/or combination of materials that may withstand the extreme heat associated with wildfires (e.g., 800° 0 (1,472° F.)) without catching fire, melting, deforming, or becoming otherwise compromised. In this way, the roof 402 may protect the building structure 12 beneath it within the inner volume 202.

It is understood that the orientation of the retractable roof 402 described above is for demonstration and that the retractable roof 402 may be oriented in any direction(s) as required by the system 10. For example, the retractable roof 402 may extend from the left 204 to the right 206, from the right 206 to the left 204, from the front 208 to the back 210, from the back 210 to the front 208, diagonally, in any other orientation, and in any combination thereof. In addition, the retractable roof 402 may be formed of more than one section such that a first portion extends from the left 204 to in intermediate position (e.g., to the middle) and a second portion extends from the right 206 to the intermediate position (e.g., to the middle). In another example, a first portion extends from the front 208 to an intermediate position and a second section extends from the back 210 to the intermediate position. Other configurations also may be used.

In some embodiments, the retractable roof 402 may comprise a single sheet or panel that is moved from a position generally to the side of the top opening of the inner volume 202 to a position generally covering the top of the inner volume 202.

In another embodiment, the retractable roof 402 may comprise a single sheet or panel that is hingedly coupled to one side of the top of the inner volume 202 and that is then flipped with respect to the ground level 14 to cover the top opening of the inner volume 202.

In another embodiment, the retractable roof 402 comprises two sheets or panels with the first panel hingedly coupled with a first side of the top of the inner volume 202 and a second panel hingedly coupled with a second side, located opposite the first side, of the top of the inner volume 202. Each sheet may then be flipped with respect to the ground level 14 towards one another to cover the top opening of the inner volume 202.

It is understood that the protective roof 402 may take different forms and/or architectures while fulfilling its functionality of covering the top of the inner volume 202 and protecting the building structure 12 below, and that the scope of the system 10 is not limited in any way by the form or architecture of the protective roof 402.

In some embodiments, the protective assembly 400 may include one or more roof moving mechanisms 410 that may extend the retractable roof 402 across the top of the inner volume 202 as described above, and to subsequently retract the retractable roof 402 into a configuration suitable for storage of the roof 402 (e.g., folded and stored within the housing 408). For example, the roof moving mechanisms 410 may include motor and pulley systems, winches, ratchet systems, other types of movement systems and any combination thereof. In some embodiments, the one or more movement mechanisms 410 may be positioned to move the slats 404 in the direction of arrow $M_8$ to close the roof 402 (e.g., by being positioned on the left side 204 and adapted to pull the roof 402 to the left) and/or one or more movement mechanisms 410 positioned to move the slats 404 in the direction of arrow $M_7$ to open the roof 402 (e.g., by being positioned on the right side 206 and adapted to pull the roof 402 to the right).

In some embodiments, the retractable roof 402 may be used as an outdoor patio adjacent the building structure 12 when the building structure 12 is above ground. In this implementation, the retractable roof 402 may not be stored in a compact configuration within a housing 408 when not deployed over the top of the inner volume 202, but instead, may be arranged in a generally linear and flat configuration adjacent the building structure 12. In this way, the protective cover 402 may double as the floor or lower surface of an outside area (e.g., as a deck, patio, or other type of area).

Quick Release Utilities System 500

In some embodiments, the quick release utilities system 500 is adapted to quickly disconnect and terminate various utilities (e.g., electrical, water, sewer, etc.) during an emergency and prior to the translation of the corresponding building structure to a below grade position. In this way, the utilities used by the building structure 12 while above grade may be safely disconnected prior to the movement of the building 12.

In some embodiments, the quick release utilities system 500 includes one or more centralized utility boxes 502 as shown in FIG. 21. In some embodiments, the utility box 502 is adapted to house at least some of the following (without limitation):

1. An electrical service quick release system 504;
2. A water service quick release system 506;
3. A sewer service quick release system 508;
4. Other utility services quick release systems such as a gas service quick release system; and
5. Any combination thereof.

In some embodiments as shown in FIG. B, the electrical service quick release system 504 includes a main electrical panel 510 that receives electricity from a service provider (e.g., the power grid), an electrical line 512 extending from the panel 510 and terminating with an electrical plug 514 within an electrical disconnect box 516, a breakaway plug 518 within the electrical disconnect box 516 and electrically coupled with the plug 514, and an electrical line 520 leading from the breakaway plug 518 to one or more electrical sub-panels associated with the building structure 12. During normal use, the main electrical panel 510 receives electrical service from an electrical service provider and provides electricity to the building's sub-panels through the series of connections described above.

In the event of an emergency and during or just prior to the translation of the building structure 12 to any other position via the system 10, the breakaway plug 518 may be caused to break thereby electrically disconnecting the electrical line 520 from the electrical line 512. In this way, any electrical sub-panels receiving electricity from the main panel 510 may be safely electrically disconnected from the panel 510. It may be preferable that the electrical line 510 be electrically terminated upon the breaking of the breakaway plug 518.

In some embodiments as shown in FIG. 23, the water service quick release system 506 includes an input line 522 leading from the water main, a clamp mount 524, a shut-off valve 526, a breakaway plug 528, and a flexible water line 530. The input line 522 may receive water from the water main and be secured by the clamp mount 524 just prior to the shutoff valve 526. The shutoff valve 526 may be coupled with the breakaway plug 528 that may be in turn coupled with the flexible water line 530. During normal use, water may flow from the water main through the input line 522, through the shutoff valve 526, through the breakaway plug 528, through the flexible water line 530 and into the building 12.

In the event of an emergency and during or just prior to the translation of the building structure 12 to any other position via the system 10, the breakaway plug 524 may be caused to break thereby disconnecting the flexible water line 526 from the input line 518. During this event, the shutoff valve 522 may automatically terminate the input line 518 to stop the water flow. In this way, any water lines receiving water from the input line 518 (e.g., via the flexible water line 526) may be safely disconnected from the water main.

In some embodiments as shown in FIG. 24, the sewer service quick release system 508 includes a flexible output line 528 leading from the building structure 12 to a main sewer output line 532 via a breakaway seal 530 (with cover). During normal use, waste travels out of the building 12 via the flexible output line 528 through the seal 530 and out through the main sewer output line 532.

In the event of an emergency and during or just prior to the translation of the building structure 12 to any other position via the system 10, the breakaway seal 530 may be caused to break thereby disconnecting the flexible output line 528 from the main sewer output line 532. During this event, the breakaway seal's cover may be deployed to close the seal 530. In this way, the building's output sewage lines 528 may be disconnected and terminated.

Triggering the System 10

In some embodiments, the system 10 is in communication third-party entities and/or systems to receive information regarding potential threats (e.g., wildfires) in the area(s) of one or more of the system's installations. For example, the system 10 may receive information from local fire agencies, fire departments, wildlife agencies, weather agencies, other types of entities and any combination thereof.

Once the system 10 may receive indications of a threat, the system 10 may verify the threat (via communications with the same or additional third-party entities) and inform the user (e.g., the homeowner).

FIG. 25 shows an overview of an exemplary framework for building structure translation system according to exemplary embodiments hereof. As shown, the system 10 may include a backend system 600 and an application 700 (e.g., software residing on a local computer, a mobile application or "app", a website viewed using a browser, or other types of applications) that may be used to interface with the system 10. The interface may include a network 602 (e.g., the Internet, LAN, WAN, etc.), wireless communication systems, cellular communication systems, telephony or other types of communication systems or protocols.

The system 10 may be accessed by multiple users (e.g., homeowners) via the network 102 and using the application 700 running on one or more computing devices 800 (e.g., smart phones, tablet computers, laptops, desktop computers, mobile media players, etc.).

In some embodiments, the backend system 600 may include a cloud platform (e.g., one or more backend servers), one or more local controllers, or any combination thereof. In some embodiments, the backend system 600 includes a cloud platform that interfaces with one or more local controllers. For example, administrators of the system 10 may interface with the system 10 via a local controller in communication with a cloud platform.

The backend system 600 may include a plurality of applications 604 and databases 606 as will be described in other sections.

The application 700 includes a graphical user interface (GUI) that may be presented on the device's display and that includes controls (e.g., touchscreen and/or mechanical buttons, etc.) that a user may activate to interact with the system 10. For example, the GUI may include controls and/or other mechanisms that enable the user to interface with the system 10 to log into the system 10, receive information from the system 10 (e.g., warnings of potential threats), control the system 10, activate the system 10 (e.g., lower the building structure 12) and to perform other functionalities. In some embodiments, the application 700 may present instructions, wizards, and/or other types of guidance to the users via the GUI. In addition, the application 700 may accommodate any language.

In some embodiments, the backend system 600 may interface with third-party entities 800 (e.g., local fire departments) to receive information regarding potential threats to building structures 12 utilizing the system 10. The system 10 may then send the user a message regarding the threat, e.g., to the mobile application 700 residing on the user's device 800.

In some embodiments, the system 10 may include an onsite sensor system 900 that detects the threat of a wildfire or other threat and informs the user of the potential threat. For example, the sensor 900 may include a UV and/or heat sensor that may be used to sense an oncoming wildfire threat.

Figure 26:
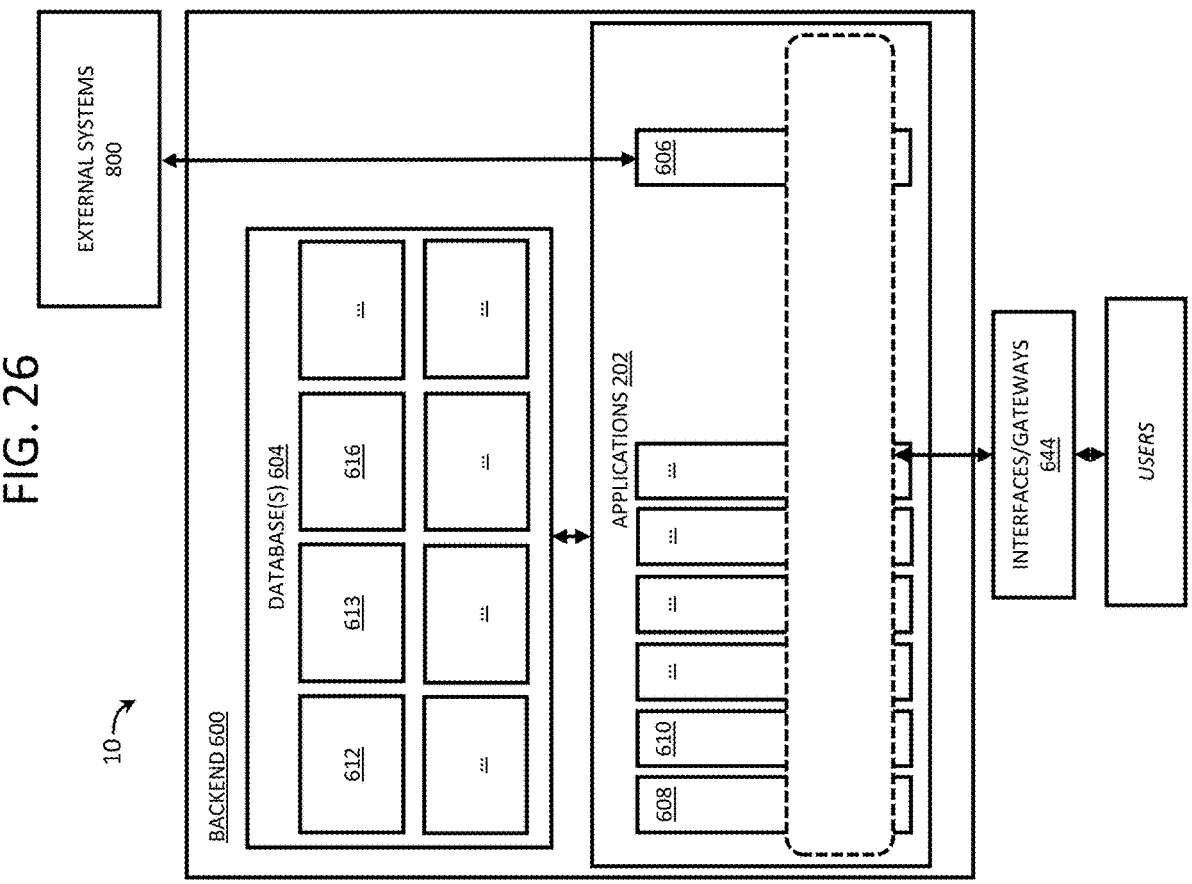
FIG. 26 shows aspects of a backend system of a building structure translation system assembly according to exemplary embodiments hereof.

FIG. 26 shows aspects of an exemplary building structure translation system 10 of FIG. 25. As shown, the system 10 and backend system 600 comprises various internal applications 604 and one or more databases 606, described in greater detail below. The internal applications 604 may generally interact with the one or more databases 606 and the data stored therein.

The database(s) 606 may comprise one or more separate or integrated databases, at least some of which may be distributed. The database(s) 606 may be implemented in any manner, and, when made up of more than one database, the various databases need not all be implemented in the same way. It should be appreciated that the system is not limited by the nature or location of database(s) 606 or by the manner in which they are implemented.

Each of the internal applications 604 may provide one or more services via an appropriate interface. Although shown as separate applications 604 for the sake of this description, it is appreciated that some or all of the various applications 604 may be combined. The various applications 604 may be implemented in any manner and need not all be implemented in the same way (e.g., using the same software languages, interfaces, or protocols).

In some embodiments, the applications 604 may include one or more of the following applications 604:
1. Input/output data application(s) 606. This application may input data from and/or output data to the application 700, third-party entities 800 and/or other sources.
2. Building structure translation application(s) 608. This application may control the translation of the building structure 12 during use of the system 10.
3. Data reporting application(s) 610. This application may generate any type of report regarding the use and/or functionalities of the system 10.

The applications 604 also may include other applications and/or auxiliary applications (not shown). Those of ordinary skill in the art will appreciate and understand, upon reading this description, that the above list of applications is meant for demonstration and that the system 10 may include other applications that may be necessary for the system 10 to generally perform its functionalities as described in this specification. In addition, as should be appreciated, embodiments or implementations of the system 10 need not include all of the applications listed, and that some or all of the applications may be optional. It is also understood that the scope of the system 10 is not limited in any way by the applications that it may include.

In some embodiments, the database(s) 206 may include one or more of the following databases 206:
1. Data log database(s) 612. This database may store any type of information regarding use of the system 10.
2. Building structure database(s) 614. This database may store any type of information regarding any building structure 12 that may be used with the system 10.
5. Data report(s) database(s) 616. This database may store any reports of any kind generated by the system 10.

It is understood that the above list of databases is meant for demonstration and that the system 10 may include some or all of the databases, and also may include additional databases as required. It is also understood that the scope of the system 10 is not limited in any way by the databases that it may include.

Various applications 604 and databases 602 in the system 10 may be accessible via interface(s) 642. These interfaces 642 may be provided in the form of APIs or the like and made accessible to external users (e.g., home owners, etc.) via one or more gateways and interfaces 644 (e.g., via a web-based application 700 and/or a mobile application 700 running on the a user's personal device 800 such as a mobile phone, tablet computer, desktop computer, laptop computer, etc.).

It is understood that any aspect and/or element of any embodiment described herein or otherwise may be combined in any way to form new embodiments all of which are easily understood by a person of ordinary skill in the art and all of which are within the scope of the system 10.

Those of ordinary skill in the art will appreciate and understand, upon reading this description, that embodiments hereof may provide different and/or other advantages, and that not all embodiments or implementations need have all advantages.

In Use

Figure 27:
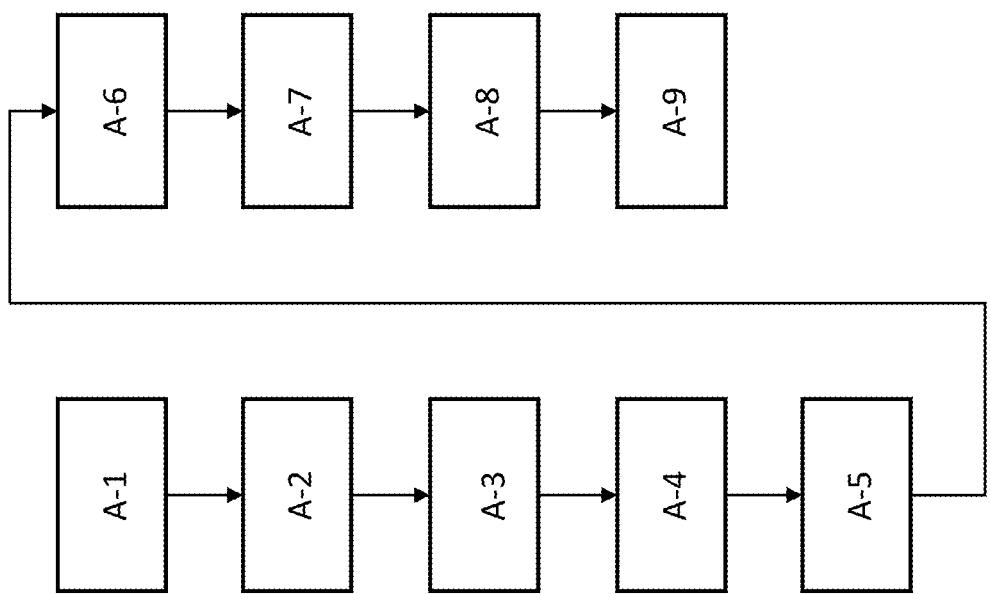
FIG. 27 is a workflow chart showing the use of a building structure translation system assembly according to exemplary embodiments hereof.

During use of the system 10 as shown in FIG. 27, at least some of the steps described below may be performed:
A-1. A threat such as a wildfire, tornado, hurricane, or other type of threat may be detected. Notification of the potential threat may come from a third-party entity, a sensor, or from other sources.
A-2. The system 10 may notify the user of the threat and ask the user to confirm that the threat is credible.
A-3. If the threat is deemed credible, the system 10 may recommend to the user that the building structure 12 be translated to a below grade position for protection.
A-4. The user may confirm receipt of the recommendation and either accept the recommendation or deny the recommendation.
A-5. If the user confirms receipt of the recommendation and subsequently accepts the recommendation, the system 10 may translate the building structure 12 from the above grade position to a below grade position as described herein. The system 10 may log the event.

A-6. If the user confirms receipt of the recommendation and denies the recommendation, the system 10 logs the event information and does not translate the building structure 12 to another position.

A-7. If the user does not confirm receipt of the recommendation after a predetermined amount of time, and the system 10 deems the threat to be credible, the system 10 may automatically accept the recommendation and translate the building structure 12 from the above grade position to a below grade position as described herein. The system 10 may log the event.

A-6. During any building structure 12 translation, the quick release utility system 400 may disconnect and terminate the electrical services, the water services, and the sewer services.

A-7. Once the building structure 12 is fully translated to the below grade position, the system 10 may implement the upper protective assembly 400 and extend the retractable roof 402 to cover the top of the inner volume 202. Once the retractable roof 402 has been fully deployed, the fire suppressant system 350 may be activated to distribute a fire suppression element (e.g., Halon) as described in other sections.

A-8. Once the threat is deemed to be over, the user may instruct the system 10 to translate the building structure 12 back to the primary position.

A-9. In some implementations, a separate system such as a crane may be employed to perform step (A-8).

It is understood that the steps provided above are meant for demonstration and that not all steps may be taken, additional steps not described may be taken, and the steps may be taken in different order. It also is understood that the scope of the system 10 is not limited in any way by the steps that it may take during its operation.

It is understood that any aspects of any embodiment(s) of the system 10 described herein or otherwise may be combined to form additional embodiments of the system 10 all of which are within the scope of the system 10.

Computing

The services, mechanisms, operations and acts shown and described above are implemented, at least in part, by software running on one or more computers or computer systems or devices. It should be appreciated that each user device is, or comprises, a computer system.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 28:
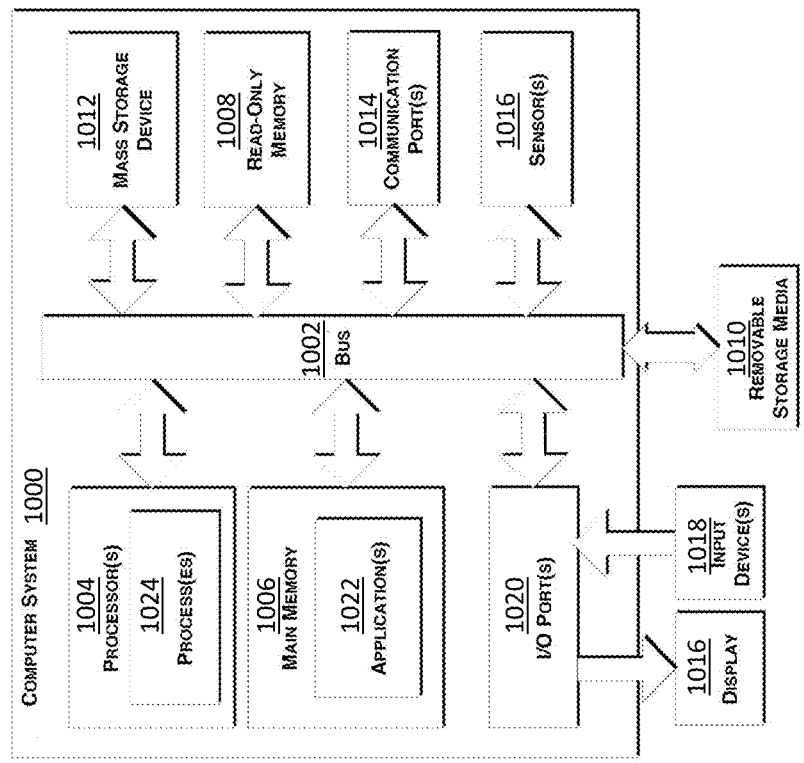
FIG. 28 depicts aspects of a computing system according to exemplary embodiments hereof.

FIG. 28 is a schematic diagram of a computer system 1000 upon which embodiments of the present disclosure may be implemented and carried out.

According to the present example, the computer system 1000 includes a bus 1002 (i.e., interconnect), one or more processors 1004, one or more communications ports 1014, a main memory 1006, removable storage media 1010, read-only memory 1008, and a mass storage 1012. Communication port(s) 1014 may be connected to one or more networks by way of which the computer system 1000 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 1004 can be (or include) any known processor, such as, but not limited to, an Intel® Itanium® or Itanium 2® processor(s), AMD® Opteron® or Athlon MP® processor(s), or Motorola® lines of processors, and the like. Communications port(s) 1014 can be any of an RS-232 port for use with a modem-based dial-up connection, a 10/100 Ethernet port, a Gigabit port using copper or fiber, or a USB port, and the like. Communications port(s) 1014 may be chosen depending on a network such as a Local Area Network (LAN), a Wide Area Network (WAN), a CDN, or any network to which the computer system 1000 connects. The computer system 1000 may be in communication with peripheral devices (e.g., display screen 1016, input device(s) 1018) via Input/Output (I/O) port 1020. Some or all of the peripheral devices may be integrated into the computer system 1000, and the input device(s) 1018 may be integrated into the display screen 1016 (e.g., in the case of a touch screen).

Main memory 1006 can be Random Access Memory (RAM), or any other dynamic storage device(s) commonly known in the art. Read-only memory 1008 can be any static storage device(s) such as Programmable Read-Only Memory (PROM) chips for storing static information such as instructions for processor(s) 1004. Mass storage 1012 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 1002 communicatively couples processor(s) 1004 with the other memory, storage and communications blocks. Bus 1002 can be a PCI/PCI-X, SCSI, a Universal Serial Bus (USB) based system bus (or other) depending on the storage devices used, and the like. Removable storage media 1010 can be any kind of external hard-drives, floppy drives, IOMEGA® Zip Drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor, or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 1006 is encoded with application(s) 1022 that support(s) the functionality as discussed herein (an application 1022 may be an application that provides some or all of the functionality of one or more of the mechanisms described herein). Application(s) 1022 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 1004 accesses main memory 1006 via the use of bus 1002 in order to launch, run, execute, interpret or otherwise perform the logic instructions of the application(s) 1022. Execution of application(s) 1022 produces processing functionality of the service(s) or mechanism(s) related to the application(s). In other words, the process(es) 1024 represents one or more portions of the application(s) 1022 performing within or upon the processor(s) 1004 in the computer system 1000.

It should be noted that, in addition to the process(es) 1024 that carries(carry) out operations as discussed herein, other embodiments herein include the application 1022 itself (i.e., the un-executed or non-performing logic instructions and/or data). The application 1022 may be stored on a computer readable medium (e.g., a repository) such as a disk or in an optical medium. According to other embodiments, the application 1022 can also be stored in a memory type system such as in firmware, read only memory (ROM), or, as in this example, as executable code within the main memory 1006 (e.g., within Random Access Memory or RAM). For example, application 1022 may also be stored in removable storage media 1010, read-only memory 1008, and/or mass storage device 1012.

Those skilled in the art will understand that the computer system 600 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

Those of ordinary skill in the art will appreciate and understand, upon reading this description, that embodiments hereof may provide different and/or other advantages, and that not all embodiments or implementations need have all advantages.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e.g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" or "approximately 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

The invention claimed is:

1. A building structure translation system comprising:
   a building base including a bottom side and a top side, the top side adapted to support a building structure,
   a receiving structure including an inner volume with a first bottom and an open top, the first bottom including a right side, a left side, a front side and a back side, the inner volume adapted to receive the building base and the building structure through the open top; and
   a translation assembly disposed between the first bottom and the bottom side of the building base and adapted to translate the building base from a first position to a second position, the translation assembly comprising:
      a first scissor lift positioned in a front left corner of the first bottom in a left-to-right orientation and including a first base and a first platform configured above the first base, a first lift first arm and a first lift second arm rotatably coupled at a first pivot point, the first lift first arm including a lower end rotatably coupled to the first base at a second pivot point and an upper end movably coupled to the first platform at a first movement location, the first lift second arm including a lower end movably coupled to the first base at a second movement location and an upper end rotatably coupled to the first platform at a third pivot point, and a first lift longitudinal vector with an initial point at the second pivot point and extending through the second movement location;
      a second scissor lift positioned in a front right corner of the first bottom in a front-to-back orientation and including a second base and a second platform configured above the second base, a second lift first arm and a second lift second arm rotatably coupled at a fourth pivot point, the second lift first arm including a lower end rotatably coupled to the second base at a fifth pivot point and an upper end movably coupled to the second platform at a third movement location, the second lift second arm including a lower end movably coupled to the second base at a fourth movement location and an upper end rotatably coupled to the second platform at a sixth pivot point, and a second lift longitudinal vector with an initial point at the fifth pivot point and extending through the fourth movement location;
      a third scissor lift positioned in a back right corner of the first bottom in a right-to-left orientation and including a third base and a third platform configured above the third base, a third lift first arm and a third lift second arm rotatably coupled at a seventh pivot point, the third lift first arm including a lower end rotatably coupled to the third base at a eighth pivot point and an upper end movably coupled to the third platform at a fifth movement location, the second lift second arm including a lower end movably coupled to the third base at a sixth movement location and an upper end rotatably coupled to the third platform at a ninth pivot point, and a third lift longitudinal vector with an initial point at the eighth pivot point and extending through the sixth movement location; and a fourth scissor lift positioned in a back left corner of the first bottom in a back-to-front orientation and including a fourth base and a fourth platform configured above the fourth base, a fourth lift first arm and a fourth lift second arm rotatably coupled at a tenth pivot point, the fourth lift first arm including a lower end rotatably coupled to the fourth base at an eleventh pivot point and an upper end movably coupled to the fourth platform at a seventh movement location, the fourth lift second arm including a lower end movably coupled to the fourth base at a eighth movement location and an upper end rotatably coupled to the fourth platform at a twelfth pivot point, and a fourth lift longitudinal vector with an initial point at the eleventh pivot point and extending through the eighth movement location;

wherein the first lift longitudinal vector intersects the second lift longitudinal vector, the second lift longitudinal vector intersects the third lift longitudinal vector, the third lift longitudinal vector intersects the fourth longitudinal vector, and the fourth lift longitudinal vector intersects the first lift longitudinal vector;

wherein the first lift longitudinal vector is orthogonal to the second lift longitudinal vector, the second lift longitudinal vector is orthogonal to the third lift longitudinal vector, the third lift longitudinal vector is orthogonal to the fourth lift longitudinal vector, and the fourth lift longitudinal vector is orthogonal to the first lift longitudinal vector.

2. The system of claim 1 wherein the second position places the building structure in a below grade position.

3. The system of claim 1 further comprising a mobile application adapted to interface with the translation assembly and to trigger the translation assembly to translate the base from the first position to the second position.

4. The system of claim 1 further comprising a protective cover deployable to cover the receiving structure's open top when the base and the building structure are received into the inner volume;
    wherein the protective cover comprises two or more slats hingedly coupled and adapted to transition from a folded configuration to an unfolded configuration during deployment.

5. The system of claim 1 wherein the building structure includes a residential building and/or a commercial building.

6. The system of claim 1 further comprising a mobile application adapted to interface with the translation assembly.

7. The system of claim 6 wherein the mobile application is adapted to trigger the translation assembly to translate the base from the first position to the second position.

8. The system of claim 1 further comprising a fire suppression system.

9. The system of claim 1 further comprising:
    a quick release system adapted to disconnect at least one utility service associated with the building structure when the base is translated from the first position to the second position.

10. The system of claim 9 wherein the quick release system comprises:
    a first electrical line leading from a power panel to an electrical plug;
    an electrical break-away plug configured with the electrical plug; and
    a second electrical line leading from the break-away plug to the building structure;
    wherein the break-away plug is adapted to break upon the translation of the base from a first position to a second position.

11. The system of claim 9 wherein the quick release system comprises:
    a first water line leading from a main water supply to a shutoff valve;
    a break-away plug configured with the shutoff valve; and
    a second water line leading from the break-away plug to the building structure;
    wherein the break-away plug is adapted to break, and the shutoff valve is adapted to shut upon the translation of the base from a first position to a second position.

12. The system of claim 9 wherein the quick release system comprises:
    a first output sewage line leading from the building structure to a break-away seal and cover;
    a second output sewage line leading from the break-away seal and cover to a sewage disposal system;
    wherein the break-away seal is adapted to break upon the translation of the base from a first position to a second position; and
    wherein the cover is adapted to close upon the breaking of the break-away seal.

13. The building structure translation system of claim 1 wherein the first scissor lift longitudinal axis is parallel to the third scissor lift longitudinal axis, and the second scissor lift longitudinal axis is parallel to the fourth scissor lift longitudinal axis.

14. The building structure translation system of claim 1 wherein the first bottom includes a first perimeter including a first perimeter front left corner, a first perimeter front right corner, a first perimeter back right corner, and a first perimeter back left corner;
    wherein the arrangement of the first scissor lift, the second scissor lift, the third scissor lift, and the fourth scissor lift defines a second perimeter including a second perimeter front left corner, a second perimeter front right corner, a second perimeter back right corner, and a second perimeter back left corner; and
    wherein the first perimeter front left corner is aligned with the second perimeter front left corner, the first perimeter front right corner is aligned with the second perimeter front right corner, the first perimeter back right corner is aligned with the second perimeter back right corner, and the first perimeter back left corner is aligned with the second perimeter back left corner.

15. The building structure translation system of claim 14 wherein the first perimeter and the second perimeter are each rectangular.

16. The building structure translation system of claim 1 wherein the arrangement of the first scissor lift and the second scissor lift defines a third perimeter, wherein the third perimeter is L-shaped.

17. The building structure translation system of claim 1 wherein the arrangement of the second scissor lift and the third scissor lift defines a fourth perimeter, wherein the fourth perimeter is L-shaped.

18. The building structure translation system of claim 1 wherein the arrangement of the third scissor lift and the fourth scissor lift defines a fifth perimeter, wherein the fifth perimeter is L-shaped.

19. The building structure translation system of claim 1 comprising a total of four scissor lifts.

20. A method of translating a building structure, the method comprising:
    (A) supporting the building structure on a building base;

(B) forming an open volume below the base, the open volume including a first bottom and a right side, a left side, a front side and a back side;

(C) disposing a translation assembly between the base and the first bottom, the translation assembly adapted to translate the base from a first position to a second position and comprising a first scissor lift positioned in a front left corner of the first bottom in a left-to-right orientation and including a first base and a first platform configured above the first base, a first lift first arm and a first lift second arm rotatably coupled at a first pivot point, the first lift first arm including a lower end rotatably coupled to the first base at a second pivot point and an upper end movably coupled to the first platform at a first movement location, the first lift second arm including a lower end movably coupled to the first base at a second movement location and an upper end rotatably coupled to the first platform at a third pivot point, and a first lift longitudinal vector with an initial point at the second pivot point and extending through the second movement location; a second scissor lift positioned in a front right corner of the first bottom in a front-to-back orientation and including a second base and a second platform configured above the second base, a second lift first arm and a second lift second arm rotatably coupled at a fourth pivot point, the second lift first arm including a lower end rotatably coupled to the second base at a fifth pivot point and an upper end movably coupled to the second platform at a third movement location, the second lift second arm including a lower end movably coupled to the second base at a fourth movement location and an upper end rotatably coupled to the second platform at a sixth pivot point, and a second lift longitudinal vector with an initial point at the fifth pivot point and extending through the fourth movement location; a third scissor lift positioned in a back right corner of the first bottom in a right-to-left orientation and including a third base and a third platform configured above the third base, a third lift first arm and a third lift second arm rotatably coupled at a seventh pivot point, the third lift first arm including a lower end rotatably coupled to the third base at a eighth pivot point and an upper end movably coupled to the third platform at a fifth movement location, the second lift second arm including a lower end movably coupled to the third base at a sixth movement location and an upper end rotatably coupled to the third platform at a ninth pivot point, and a third lift longitudinal vector with an initial point at the eighth pivot point and extending through the sixth movement location; and a fourth scissor lift positioned in a back left corner of the first bottom in a back-to-front orientation and including a fourth base and a fourth platform configured above the fourth base, a fourth lift first arm and a fourth lift second arm rotatably coupled at a tenth pivot point, the fourth lift first arm including a lower end rotatably coupled to the fourth base at an eleventh pivot point and an upper end movably coupled to the fourth platform at a seventh movement location, the fourth lift second arm including a lower end movably coupled to the fourth base at a eighth movement location and an upper end rotatably coupled to the fourth platform at a twelfth pivot point, and a fourth lift longitudinal vector with an initial point at the eleventh pivot point and extending through the eighth movement location;

wherein the first lift longitudinal vector intersects the second lift longitudinal vector, the second lift longitudinal vector intersects the third lift longitudinal vector, the third lift longitudinal vector intersects the fourth longitudinal vector, and the fourth lift longitudinal vector intersects the first lift longitudinal vector;

wherein the first lift longitudinal vector is orthogonal to the second lift longitudinal vector, the second lift longitudinal vector is orthogonal to the third lift longitudinal vector, the third lift longitudinal vector is orthogonal to the fourth lift longitudinal vector, and the fourth lift longitudinal axis is orthogonal to the first lift longitudinal vector;

(D) providing a protective cover deployable to cover the open volume;

(E) using the translation assembly to translate the base from a first position to a second position; and (F) deploying the protective cover to cover the open volume.

* * * * *